(12) United States Patent
Jang et al.

(10) Patent No.: US 11,202,547 B2
(45) Date of Patent: Dec. 21, 2021

(54) CLEANER

(71) Applicant: LG ELECTRONICS INC., Seoul (KR)

(72) Inventors: Jaewon Jang, Seoul (KR); Jeongseop Park, Seoul (KR); Sungho Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/333,144

(22) PCT Filed: Jul. 14, 2017

(86) PCT No.: PCT/KR2017/007557
§ 371 (c)(1),
(2) Date: Mar. 13, 2019

(87) PCT Pub. No.: WO2018/012918
PCT Pub. Date: Jan. 18, 2018

(65) Prior Publication Data
US 2019/0223681 A1 Jul. 25, 2019

Related U.S. Application Data

(60) Provisional application No. 62/362,358, filed on Jul. 14, 2016.

(51) Int. Cl.
*A47L 11/28* (2006.01)
*A47L 11/283* (2006.01)
(Continued)

(52) U.S. Cl.
CPC ............ *A47L 11/283* (2013.01); *A47L 9/009* (2013.01); *A47L 9/0606* (2013.01);
(Continued)

(58) Field of Classification Search
CPC ...... A47L 11/283; A47L 9/009; A47L 9/0606; A47L 9/2826; A47L 9/2852; A47L 9/14;
(Continued)

(56) References Cited

U.S. PATENT DOCUMENTS 3,381,334 A 5/1968 Redmond
3,827,099 A 8/1974 Allaire et al.
(Continued)

FOREIGN PATENT DOCUMENTS

CN 1568156 1/2005
CN 1721815 1/2006
(Continued)

OTHER PUBLICATIONS

PCT Search Report dated Sep. 28, 2017, on PCT International Patent appl. No. PCT/KR2017/007549.
(Continued)

*Primary Examiner* — Katina N. Henson
(74) *Attorney, Agent, or Firm* — Finnegan, Henderson, Farabow, Garrett & Dunner, LLP

(57) ABSTRACT

A cleaner includes a body forming an external appearance, and a spin-mop cleaning module configured to support the body and including at least one spin-mop provided so as to come into contact with a floor while rotating in a clockwise direction or in a counterclockwise direction when viewed from an upper side. The inclination angle of a lower surface of the spin mop is changeable relative to a horizontal plane.

13 Claims, 33 Drawing Sheets

(51) Int. Cl.

| | | |
|---|---|---|
| A47L 11/293 | (2006.01) | |
| A47L 11/14 | (2006.01) | |
| A47L 11/282 | (2006.01) | |
| B08B 3/04 | (2006.01) | |
| B08B 3/08 | (2006.01) | |
| A47L 11/292 | (2006.01) | |
| A47L 11/40 | (2006.01) | |
| A47L 11/16 | (2006.01) | |
| A47L 11/34 | (2006.01) | |
| B25J 9/16 | (2006.01) | |
| B25J 11/00 | (2006.01) | |
| G05D 1/02 | (2020.01) | |
| A47L 9/00 | (2006.01) | |
| A47L 9/06 | (2006.01) | |
| A47L 11/20 | (2006.01) | |
| B25J 5/00 | (2006.01) | |
| B25J 9/00 | (2006.01) | |
| B25J 9/12 | (2006.01) | |
| A47L 13/20 | (2006.01) | |
| B08B 1/04 | (2006.01) | |
| A47L 9/28 | (2006.01) | |
| A47L 11/24 | (2006.01) | |
| A47L 11/00 | (2006.01) | |

(52) U.S. Cl.
CPC ............ *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 11/00* (2013.01); *A47L 11/145* (2013.01); *A47L 2201/00* (2013.01); *A47L 2201/04* (2013.01); *A47L 2201/06* (2013.01); *B08B 2203/00* (2013.01); *G05D 2201/0203* (2013.01)

(58) Field of Classification Search
CPC ........ A47L 11/14; A47L 11/16; A47L 11/161; A47L 11/20; A47L 11/201; A47L 11/24; A47L 11/282; A47L 11/292; A47L 11/293; A47L 11/34; A47L 11/40; A47L 11/4011; A47L 11/4013; A47L 11/4038; A47L 11/4058; A47L 11/4061; A47L 11/4066; A47L 11/4069; A47L 11/4072; A47L 11/408; A47L 11/4083; A47L 11/4088; A47L 13/20; B08B 1/04; B08B 1/041; B08B 1/08; B25J 9/1664; B25J 11/00; B25J 11/0085; G05D 1/0223

USPC .......................................................... 15/98
See application file for complete search history.

(56) References Cited

U.S. PATENT DOCUMENTS

| | | |
|---|---|---|
| 4,418,342 A | 11/1983 | Aschoff et al. |
| 5,991,951 A | 11/1999 | Kubo et al. |
| 6,493,896 B1 | 12/2002 | Stuchlik et al. |
| 7,320,149 B1 | 1/2008 | Huffman et al. |
| 9,814,364 B1 | 11/2017 | Caruso |
| 2004/0163199 A1 | 8/2004 | Hsu |
| 2004/0221474 A1 | 11/2004 | Slutsky et al. |
| 2005/0015913 A1 | 1/2005 | Kim et al. |
| 2005/0166356 A1 | 8/2005 | Uehigashi |
| 2005/0183230 A1 | 8/2005 | Uehigashi |
| 2006/0185690 A1 | 8/2006 | Song |
| 2007/0261715 A1 | 11/2007 | Lee et al. |
| 2010/0031463 A1 | 2/2010 | Adams et al. |
| 2012/0084938 A1 | 4/2012 | Fu |
| 2012/0125363 A1 | 5/2012 | Kim et al. |
| 2013/0096717 A1 | 4/2013 | Yoon et al. |
| 2013/0263889 A1 | 10/2013 | Yoon et al. |
| 2014/0130289 A1 | 5/2014 | Hyun et al. |
| 2014/0209122 A1 | 7/2014 | Jung et al. |
| 2015/0142169 A1 | 5/2015 | Kim et al. |
| 2015/0143646 A1* | 5/2015 | Jeong .................. A47L 11/4088 15/98 |
| 2015/0150429 A1 | 6/2015 | Yoo et al. |
| 2015/0182090 A1 | 7/2015 | Park et al. |
| 2015/0196183 A1 | 7/2015 | Clark et al. |
| 2015/0342431 A1 | 12/2015 | Zydek |
| 2016/0022109 A1 | 1/2016 | Dooley et al. |
| 2016/0051108 A1 | 2/2016 | Huang et al. |
| 2018/0120833 A1 | 5/2018 | Lindhe et al. |
| 2019/0270124 A1 | 9/2019 | Jang et al. |

FOREIGN PATENT DOCUMENTS

| | | |
|---|---|---|
| CN | 1823677 | 8/2006 |
| CN | 2817718 U | 9/2006 |
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 103006153 | 4/2013 |
| CN | 203113255 U | 8/2013 |
| CN | 203296009 U | 11/2013 |
| CN | 103717117 A | 4/2014 |
| CN | 104244794 A | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 2702918 A1 | 3/2014 |
| EP | 2762051 A2 | 8/2014 |
| EP | 3485785 | 5/2019 |
| JP | H03123522 | 5/1991 |
| JP | 05300860 A * | 11/1993 |
| JP | H05-300860 | 11/1993 |
| JP | H11-178764 | 7/1999 |
| JP | 2000-051128 | 2/2000 |
| JP | 2000070203 A | 3/2000 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |
| KR | 20-0435111 U | 1/2007 |

(56) References Cited

FOREIGN PATENT DOCUMENTS

| | | |
|---|---|---|
| KR | 10-0822785 | 4/2008 |
| KR | 10-2009-0026031 | 3/2009 |
| KR | 10-20090086657 | 8/2009 |
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |
| KR | 20-2012-0002399 U | 4/2012 |
| KR | 10-2012-0042391 | 5/2012 |
| KR | 10-2012-0055891 | 6/2012 |
| KR | 10-2012-0100682 | 9/2012 |
| KR | 10-20130042423 | 4/2013 |
| KR | 10-1303159 | 9/2013 |
| KR | 10-2013-0129059 | 11/2013 |
| KR | 10-20140022472 | 2/2014 |
| KR | 10-2015-0014351 | 2/2015 |
| KR | 10-2015-0022133 | 3/2015 |
| KR | 10-2015-0031821 | 3/2015 |
| KR | 10-2015-0048490 | 5/2015 |
| KR | 10-2015-0057959 | 5/2015 |
| KR | 10-1522177 | 5/2015 |
| KR | 10-2015-0060030 | 6/2015 |
| KR | 10-20150078094 | 7/2015 |
| KR | 10-2015-0107396 | 9/2015 |
| KR | 10-2015-0107693 | 9/2015 |
| KR | 10-20150107693 | 9/2015 |
| KR | 10-2015-0116311 | 10/2015 |
| KR | 10-1569058 | 11/2015 |
| KR | 10-2015-0139111 | 12/2015 |
| KR | 10-1578887 | 12/2015 |
| KR | 10-1595727 | 2/2016 |
| KR | 10-20160033615 | 3/2016 |
| KR | 10-2016-0090570 | 8/2016 |
| KR | 10-2016-0104429 | 9/2016 |
| KR | 10-2016-0122520 | 10/2016 |
| KR | 10-1678443 | 12/2016 |
| KR | 10-2018-0105109 | 9/2018 |
| TW | 537326 U | 6/2003 |
| TW | M455464 | 6/2013 |
| WO | WO 2015/186944 A1 | 12/2015 |
| WO | WO 2016/027957 | 2/2016 |
| WO | WO 2016/036183 A1 | 3/2016 |

OTHER PUBLICATIONS

PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Taiwan Office Action dated Dec. 18, 2018, on Taiwan Patent appl. No. 107101303.
Taiwan Office Action dated Dec. 25, 2018, on Taiwan Patent appl. No. 107101297.
Taiwan Office Action dated Sep. 18, 2019, on Taiwan Patent appl. No. 107101298.
Korean Notice of Allowance dated Jun. 17, 2019, on Korean Patent appl. No. 10-2018-0110855.
Korean Notice of Allowance dated Jun. 29, 2018, on Korean Patent appl. No. 10-2017-0009364.
Australian Office Action dated Jul. 16, 2019, on Australian Patent appl. No. 2017297104.
Korean Notice of Allowance dated Jun. 29, 2018, on Korean Patent Application No. 10-2017-0009364.
Korean Notice of Allowance dated Jun. 17, 2019, on Korean Patent Application No. 10-2018-0110855.
Taiwan Office Action dated Dec. 24, 2018, on Taiwan Patent Application No. 107101298.
PCT Search Report dated Nov. 20, 2017, on PCT International Patent Application No. PCT/KR2017/007551.
European Search Report dated Mar. 31, 2020, on European Patent Application No. 17827982.4.
European Search Report dated May 4, 2020, on European Patent Application No. 17827984.0.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
Taiwan Office Action dated Oct. 30, 2018, on Taiwan Patent Application No. 107101299.
Korean Office Action dated Apr. 23, 2020, on Korean Patent Application No. 10-2018-7036043.
Korean Notice of Allowance dated Apr. 28, 2020, on Korean Patent Application No. 10-2018-7036042.
Korean Notice of Allowance dated Apr. 29, 2020, on Korean Patent Application No. 10-2018-7036039.
Chinese Office Action dated Sep. 21, 2020 on Chinese Patent Application No. 201780056578.0.
EP Search Report dated Aug. 14, 2020.
U.S. Office Action dated Sep. 21, 2020 on U.S. Patent Application No. 16/333,138.
U.S. Office Action dated Oct. 6, 2020 on U.S. Appl. No. 16/333,124.
U.S. Office Action dated Oct. 9, 2020 on U.S. Appl. No. 16/333,135.
Taiwan Office Action dated May 22, 2020, on Taiwan Patent Application No. 107101298.
European Search Report dated May 26, 2020, on European Patent Application No. 17827993.1.
European Search Report dated May 26, 2020, on European Patent Application No. 17827985.7.
Korean Notice of Allowance dated Jul. 1, 2020, on Korean Patent Application No. 10-2018-7036041.
U.S. Office Action dated Jul. 15, 2020, on U.S. Appl. No. 16/333,129.
Chinese Office Action dated Jul. 22, 2020, on Chinese Patent Applicatuin Ni, 201780056575.7.
Chinese Office Action dated Aug. 3, 2020, on Chinese Patent Application No. 201780056675.X.
European Search Report dated Aug. 13, 2020, on European Patent Application No. 17827983.2.
Korean Office Action dated Aug. 19, 2020, on Korean Patent Application No. 10-2020-7014910.
U.S. Office Action dated Jan. 28, 2021, on U.S. Appl. No. 16/333,147.
Chinese Office Action dated Aug. 12, 2020, on Chinese Patent Application No. 201780056687.2.

* cited by examiner 120a,120b

CLEANER

CROSS-REFERENCE TO RELATED APPLICATIONS

This application is a U.S. National Phase entry under 35 U.S.C. § 371 from PCT International Application No. PCT/KR2017/007557, filed Jul. 14, 2017, which claims the benefit of priority of U.S. Provisional Application No. 62/362,358, filed Jul. 14, 2016, the contents of which are incorporated herein by reference in its entirety.

TECHNICAL FIELD

The present invention relates to a cleaner that performs mopping.

BACKGROUND ART

A cleaner is a device that performs cleaning by suctioning dirt such as dust from the floor or mopping dirt on the floor. Recently, a cleaner capable of performing mopping has been developed. In addition, a robot cleaner is a device that performs cleaning autonomously via self-driving.

There has been known a robot cleaner capable of moving using a mop surface as the related art (Korean Registered Patent Publication No. 10-1602790). In the related art, the robot cleaner includes a first rotating member and a second rotating member, to which a pair of mop surfaces is fixed so as to be arranged in the transverse direction, the first and second rotating members being tilted outwards and downwards relative to the vertical axis. The robot cleaner according to the related art is moved as the first rotating member and the second rotating member rotate in the state in which only the mop surfaces fixed to the first rotating member and the second rotating member are in contact with the floor.

DISCLOSURE

Korean Registered Patent Publication No. 10-1602790 (Registered Date: Mar. 7, 2016)

Technical Problem

A first object of the present invention is to increase the frictional force between a mop and the floor surface for effective mopping and driving of a cleaner, and enable the implementation of clean and efficient mopping.

The robot cleaner according to the related art has a problem in which it has difficulty in mopping a recessed portion when mopping a curved floor surface. A second object of the present invention is to solve this problem, and improve the mopping performance of the robot cleaner.

The robot cleaner according to the related art has a problem in that it may breakdown due to a shock-absorbing failure when mopping such a curved floor surface. A third object of the present invention is to solve this problem.

When one mop surface among the pair of mop surfaces arranged in the transverse direction of the robot cleaner according to the related art receives shocks attributable to the curvature of the floor surface, the shocks may also have an effect on the other mop surface, forming a gap or the like between the other mop surface and the floor surface, which may prevent thorough mopping. A fourth object of the present invention is to solve this problem.

A fifth object of the present invention is to stably support a robot cleaner while achieving the above-described objects.

Technical Solution

To achieve the objects described above, according to an aspect of the present invention, there is provided a cleaner including a body defining an external appearance, and a spin-mop cleaning module configured to support the body and including at least one spin-mop provided so as to come into contact with a floor while rotating in a clockwise direction or in a counterclockwise direction when viewed from an upper side. The spin-mop cleaning module rotates about a tilting rotational axis so that an inclination angle of a lower surface of the spin mop is changeable relative to a horizontal plane. The spin-mop cleaning module further includes at least one elastic member configured to apply an elastic force so that the inclination angle is increased.

The tilting rotational axis may extend in a horizontal direction.

The at least one spin mop may be provided so as to be rotatable within a predetermined range about the tilting rotational axis.

The spin-mop cleaning module may further include a mop unit provided so as to come into contact with the floor, a rotating plate to which the mop unit is fixed, and a spin shaft connected to an upper side of the rotating plate so as to rotate the rotating plate. The spin-mop cleaning module may further include a tilting frame configured to rotatably support the spin shaft and provided so as to be rotatable about the tilting rotational axis relative to the body.

The spin-mop cleaning module may further include a tilting shaft supported by the body and disposed so as to penetrate the tilting frame, the tilting shaft comprising the tilting rotational axis.

The body may include a placement hole formed in a lower surface thereof. The body may further include a support member configured to extend along an edge of the placement hole and including a center hole in which the tilting frame is disposed. The support member may include a tilting-shaft support portion configured to support the tilting shaft.

The tilting frame may include a frame base configured to form a lower surface, a vertical portion configured to protrude upward from a portion of an edge of the frame base, which extends in a direction away from the tilting rotational axis, and a distance holder. The distance holder may be configured to protrude from a portion of the vertical portion in an extending direction of the tilting rotational axis and to extend in a vertical direction.

The body may include a guide portion disposed slidably with a protruding distal end of the distance holder.

The body may include an upper-end limit configured to form a lower surface. The spin-mop cleaning module may further include an upper-end-limit contact portion configured to be brought into contact at an upper surface thereof with the upper-end limit in a state in which the inclination angle reaches a minimum value and to be spaced apart from the upper-end limit in a state in which the inclination angle exceeds the minimum value.

The body may include a lower-end limit configured to form an upper surface. The spin-mop cleaning module may further include a lower-end-limit contact portion configured to be brought into contact at a lower surface thereof with the lower-end limit in a state in which the inclination angle reaches a maximum value and to be spaced apart from the lower-end limit in a state in which the inclination angle is below the maximum value.

The spin-mop cleaning module may further include a first support portion disposed on the tilting frame and configured to support one end of the elastic member. The body may include a second support portion configured to support the other end of the elastic member.

The spin-mop cleaning module may further include a spin-drive unit fixed to the tilting frame so as to integrally move with the tilting frame, the spin-drive unit providing a drive force for rotation of the spin mop.

The at least one spin mop may include a left spin mop and a right spin mop arranged at left and right sides. A downward inclination direction of a lower surface of the left spin mop and a downward inclination direction of a lower surface of the right spin mop may be bilaterally symmetrical to each other.

The at least one elastic member may include a left elastic member configured to apply an elastic force so that an inclination angle of the lower surface of the left spin mop is increased, and a right elastic member configured to apply an elastic force so that an inclination angle of the lower surface of the right spin mop is increased.

The at least one elastic member may include a left elastic member configured to apply an elastic force so that a leftward and downward inclination of the lower surface of the left spin mop is increased, and a right elastic member configured to apply an elastic force so that a rightward and downward inclination of the lower surface of the right spin mop is increased.

A tilting rotational axis of the left spin mop and a tilting rotational axis of the right spin mop may be bilaterally symmetrical to each other.

Advantageous Effects

Through the solutions described above, a cleaner may perform more thorough and efficient mopping.

In addition, by allowing the inclination angle of the lower surface of a spin mop to be changeable, the cleaner may clearly mop even a curved floor surface. In particular, the cleaner may thoroughly mop even a recessed portion in the floor surface.

In addition, by reducing the loss of or a change in frictional force between a mop surface and the floor when the cleaner drives over an uneven floor portion, driving control by the mop surface may be facilitated.

In addition, through the provision of an elastic member, frictional force between at least one spin mop and the floor surface may be increased, which may further improve driving performance and mopping performance.

In addition, through the provision of the elastic member, elastic shock-absorbing may be realized, which may prevent a breakdown of the cleaner. The elastic member may also stably support a cleaner body.

The spin mop, the inclination of which is changeable, may exert a suspension function, and, with the inclination of the spin mop, interference of a rotating and mopping function of the spin mop and a function of supplying water to the spin mop may be minimized, which may maximize cleaner efficiency.

By allowing the lower surface of a left spin mop and the lower surface of a right spin mop to be inclined downward so as to be bilaterally symmetrical to each other, when a portion of the floor surface, which is a support point of any one of the left spin mop and the right spin mop, is curved, the other spin mop may perform a mopping function normally, and may stably support the body.

Through the provision of a support member, pre-setting and assembly of a spin-mop cleaning module may be easily performed, and easy repair of the spin-mop cleaning module may be ensured.

DESCRIPTION OF DRAWINGS

FIG. 22 is a cross-sectional view of the assembly taken along line T2-T2' of FIG. 21a.

FIG. 23 is a cross-sectional view of the assembly taken along line T3-T3' of FIG. 21a.

BEST MODE

Figure 1:
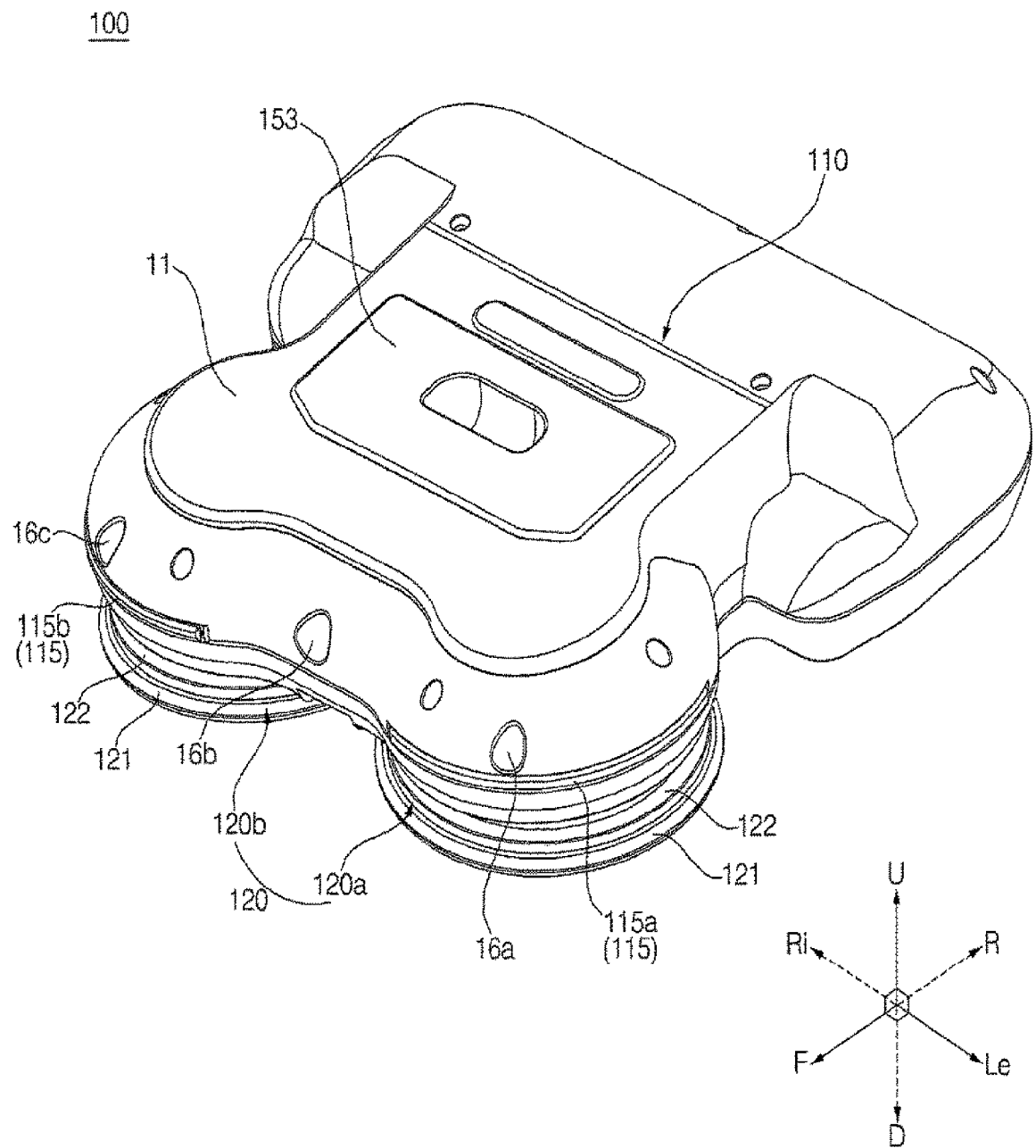
FIG. 1 is a perspective view of a cleaner 100 according to an embodiment of the present invention.
Figure 2:
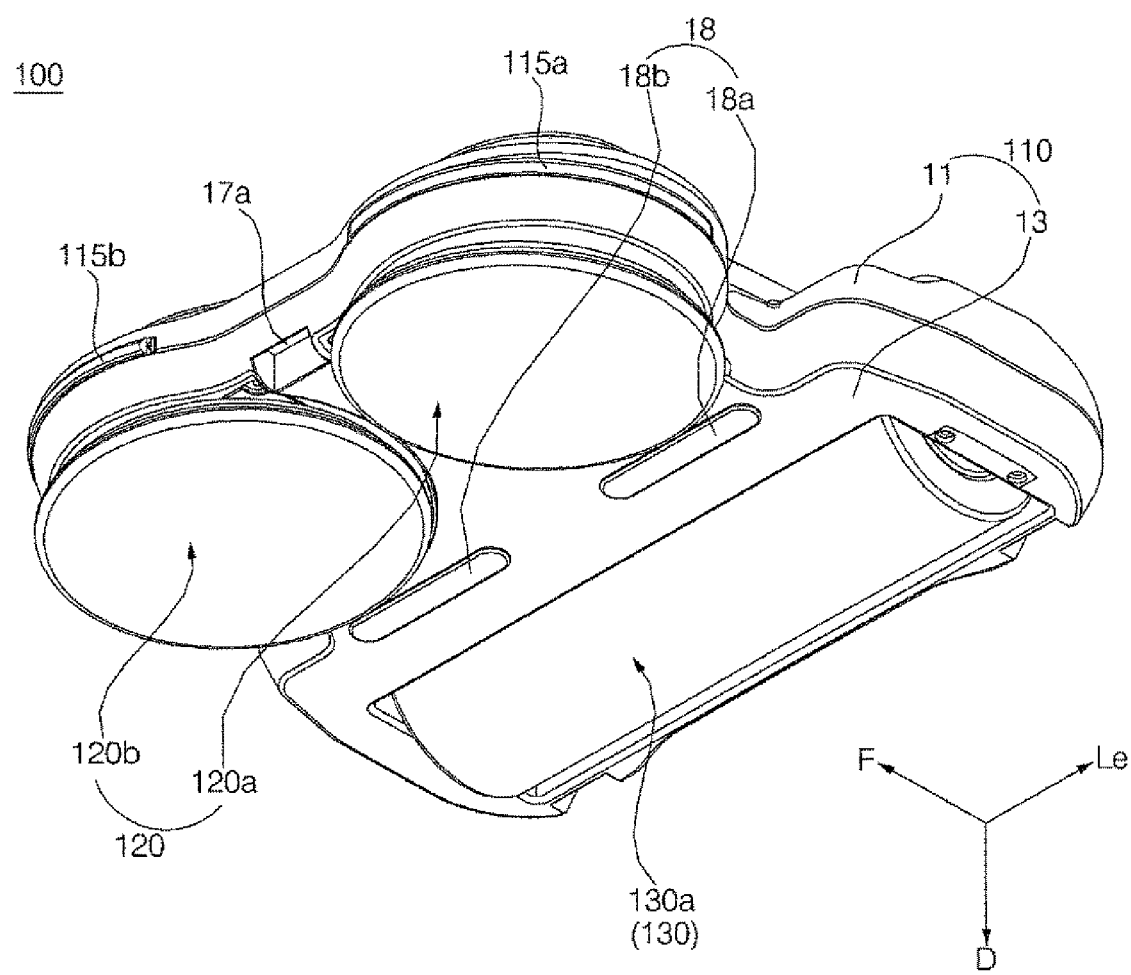
FIG. 2 is a perspective view of the cleaner 100 of FIG. 1 viewed at a different angle.

The expressions referring to directions such as "front (F)/rear (R)/left (Le)/right (R)/upper (U)/lower (D)" mentioned below are defined based on the illustrations in the drawings, but this is merely given to describe the present invention so as to be clearly understood, and it goes without saying that the respective directions may be defined differently depending on where the reference is placed.

Figure 29:
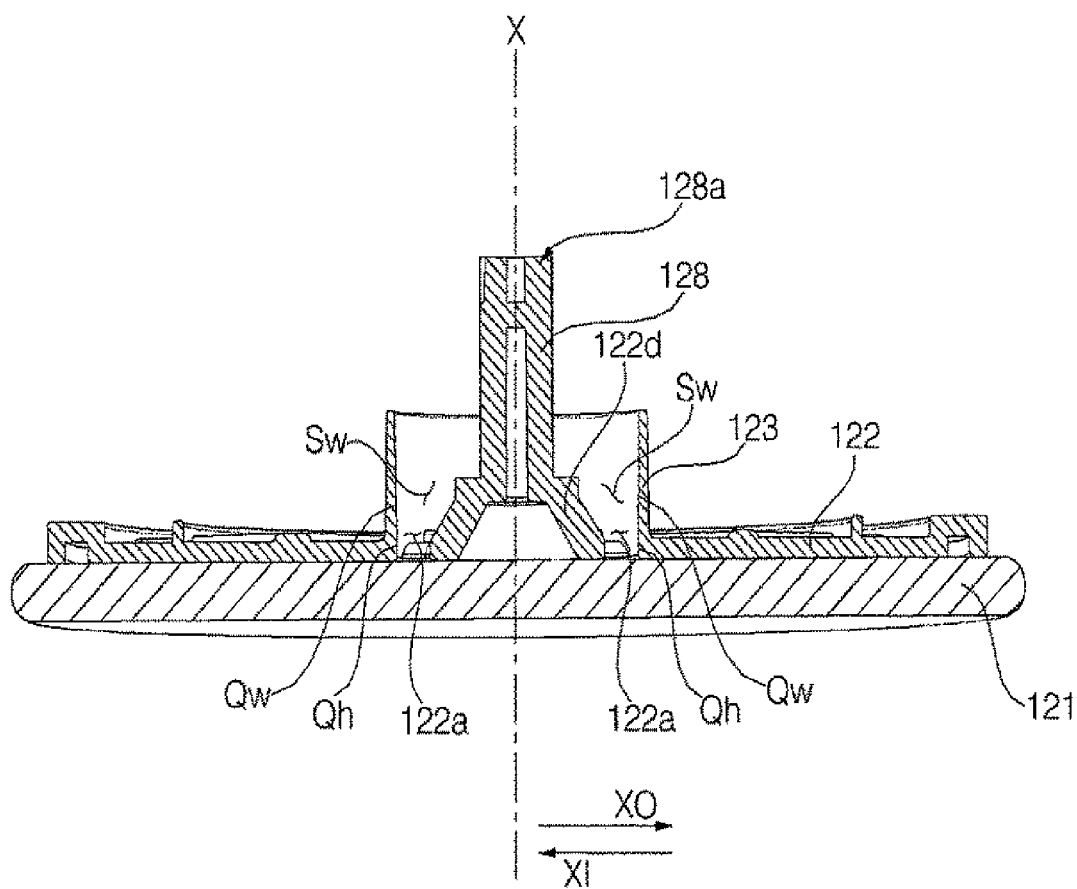
FIG. 29 is a vertical cross-sectional view of the spin mop taken along line T4-T4' of FIG. 28.
Figure 30:
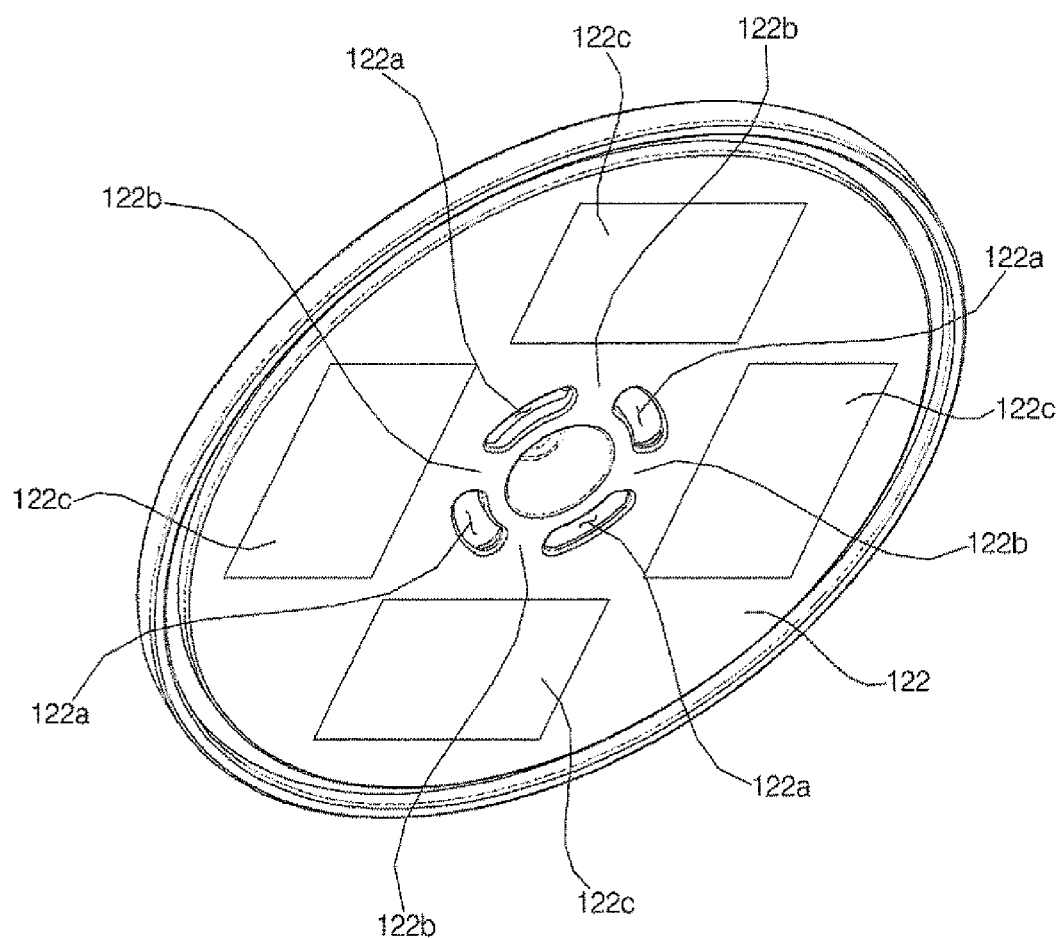
FIG. 30 is a perspective view illustrating the state in which a mop unit 121 is removed from the spin mop of FIG. 27.

With regard to any one spin mop with reference to FIG. 29, the center axis X is the rotational axis about which the spin mop rotates, the centrifugal direction XO is the direction moving away from the center axis X, and the counter-centrifugal direction XI is the direction approaching the center axis X.

The use of terms, in front of which adjectives such as "first", "second", and "third" are used to describe constituent elements mentioned below, is intended only to avoid confusion of the constituent elements, and is unrelated to the order, importance, or relationship between the constituent elements. For example, an embodiment including only a second component without a first component is also feasible.

The 'mop' mentioned below may be applied variously in terms of material such as cloth or paper material, and may be used repeatedly by washing, or may be disposable.

The present invention may be applied to a cleaner that is manually moved by a user, a robot cleaner that autonomously drives, or the like. Hereinafter, the present embodiment will be described with reference to a robot cleaner.

Referring to FIGS. 1 to 12B and FIGS. 31 to 33, a cleaner 100 according to an embodiment of the present invention includes a body 110 having a controller 20.

The cleaner 100 includes a spin-mop cleaning module 120, which supports the body 110. The spin-mop cleaning module 120 is provided to perform mopping in contact with the floor. The spin-mop cleaning module 120 includes at least one spin mop, which is provided to perform mopping by clockwise or counterclockwise rotation thereof when viewed from the upper side. The at least one spin mop is provided so as to be in contact with the floor. The at least one spin mop may include a left spin mop 120a and a right spin mop 120b. The left spin mop 120a and the right spin mop 120b are arranged at the left and right sides. The at least one spin mop is disposed at the lower side of the body 110. The body 110 may be provided so as to be movable with the rotation of the spin-mop cleaning module 120 without separate wheels.

The spin-mop cleaning module 120 includes a pair of spin-mop modules 120-1 and 120-2. The spin-mop cleaning module 120 includes a left spin-mop module 120-1 having the left spin mop 120a. The spin-mop cleaning module 120 includes a right spin-mop module 120-2 having the right spin mop 120b. The left spin-mop module 120-1 and the right spin-mop module 120-2 are provided to perform mopping. Each of the left spin-mop module 120-1 and the right spin-mop module 120-2 includes a mop unit 121, a rotating plate 122, a water supply reservoir 123, a spin shaft 128, a spin-drive unit 124, and a driving transmission unit 127. Each of the left spin-mop module 120-1 and the right spin-mop module 120-2 further includes a tilting frame 125, a tilting shaft 126, and an elastic member 129. The components included in the spin-mop cleaning module 120 may be understood as the components included in each of the left spin-mop module 120-1 and the right spin-mop module 120-2.

The body 110 may be provided so as to be supported only by the spin-mop cleaning module 120, but in the present embodiment, the spin-mop cleaning module 120 includes an additional support device 130, which supports the body 110. Hereinafter, a description will be made with reference to an embodiment including both the spin-mop cleaning module 120 and the additional support device 130, but the present invention is feasible even when the additional support device 130 is not included.

In the present embodiment, the body 110 is supported by the spin-mop cleaning module 120 and the additional support device 130. The spin-mop cleaning module 120 is disposed at the front of the additional support device 130.

The additional support device 130 is provided so as to be in contact with the floor. The additional support device 130 may include wheels, which are in contact with the floor, or may be provided so as to be in sliding contact with the floor. The additional support device 130 may be provided to perform mopping in contact with the floor. The additional support device 130 is disposed at the lower side of the body 110. The additional support device 130 is provided so as to be in contact with the floor at the rear of the spin-mop cleaning module 120.

In the present embodiment, the additional support device 130 includes a rolling mop 130a, which is provided to perform mopping via rotation thereof.

In another example, the additional support device may include a mop pad or the like, which performs mopping via sliding on the floor along with the movement of the body 110.

In still another example, the additional support device may be provided to enable vacuum cleaning.

In a further example, the additional support device may include a brush, which performs sweeping, and moreover, the brush may be provided so as to be rotatable. The brush may rotate about a rotating shaft, which extends substantially in the horizontal direction. The brush may rotate about a rotating shaft, which extends substantially in the transverse direction. The cleaner 100 may include a dust container, and the brush may be provided to sweep the floor and put impurities having a relatively large volume in the dust container.

Hereinafter, a description will be made with reference to the present embodiment, but the invention is not limited thereto. In addition, the additional support device 130 according to the present embodiment may be referred to as a rolling-mop cleaning module 130.

The rolling-mop cleaning module 130 is provided to perform mopping via clockwise or counterclockwise rotation when viewed from one side (the left side or the right side). The rolling-mop cleaning module 130 includes the rolling mop 130a. The cleaner 100 may be provided such that the body 110 is movable via rotation of the rolling-mop cleaning module 130 without separate wheels.

The cleaner 100 is provided such that the body 110 is movable via rotation of at least one of the spin-mop cleaning module 120 and the rolling-mop cleaning module 130 without separate wheels. The body 110 may be moved via only rotation of the spin-mop cleaning module 120. The body 110 may be moved via only rotation of the rolling-mop cleaning module 130. The body 110 may be moved via both rotation of the spin-mop cleaning module 120 and rotation of the rolling-mop cleaning module 130.

The cleaner 100 includes a water supply module 150, which supplies water required for mopping. The water supply module 150 may supply water required for the mopping of the spin-mop cleaning module 120 or the rolling-mop cleaning module 130. In the present embodiment, the water supply module 150 supplies water to the spin-mop cleaning module 120. The water supply module 150 supplies water to the left spin-mop module 120-1 and the right spin-mop module 120-2.

The water supply module 150 includes a water tank 151, which stores therein water to be supplied to the spin-mop cleaning module 120 or the rolling-mop cleaning module 130. In the present embodiment, the water tank 151 stores therein water to be supplied to the spin-mop cleaning module 120.

Each of the spin-mop cleaning module 120 and the rolling-mop cleaning module 130 is provided to mop the floor. In the present embodiment, the spin-mop cleaning module 120 is provided to perform wet mopping (mopping in the state in which water is supplied), and the water supply module 150 supplies water to the spin-mop cleaning module 120. In addition, in the present embodiment, the rolling-mop cleaning module 130 is provided to perform dry mopping (mopping in the state in which no water is supplied), and the water supply module 150 does not supply water to the rolling-mop cleaning module 130. In the present embodiment, the water supply module 150 supplies water to only the spin-mop cleaning module 120, among the spin-mop cleaning module 120 and the rolling-mop cleaning module 130.

The cleaner 100 includes a battery 160 for supplying power. The battery 160 may supply power required for the rotation of the spin-mop cleaning module 120. The battery 160 may supply power required for the rotation of the rolling-mop cleaning module 130.

The cleaner 100 includes a case 11 defining the external appearance of the cleaner. The case 11 defines the upper surface, the front surface, the rear surface, the left surface, and the right surface of the body 110. The cleaner 100 includes a base 13, which defines the lower surface of the body 110. The spin-mop cleaning module 120 is fixed to the base 13. The rolling-mop cleaning module 130 is fixed to the base 13. The cleaner 100 includes a rolling-mop housing 12, which is disposed on the base 13 and is recessed upward from the bottom to accommodate therein the upper portion of the rolling-mop 130a. The controller 20, the water supply module 150, and the battery 160 are disposed in the inner space defined by the case 11, the base 13, and the rolling-mop housing 12.

The cleaner 100 includes a water-tank opening/closing member 153 for opening and closing the water tank 151. The water-tank opening/closing member 153 is disposed on the upper surface of the body 110. The cleaner 100 may include a water-level display (not illustrated), which displays the level of water in the water tank 151. The water-level display may be formed of a transparent material to allow the level of water in the water tank 151 within the body 110 to be directly visible.

The cleaner 100 includes an obstacle sensor 16, which senses an obstacle at the front of the cleaner. The obstacle sensor 16 may include a plurality of obstacle sensors 16a, 16b and 16c. The obstacle sensor 16 is disposed on the front surface of the body 110.

Figure 11:
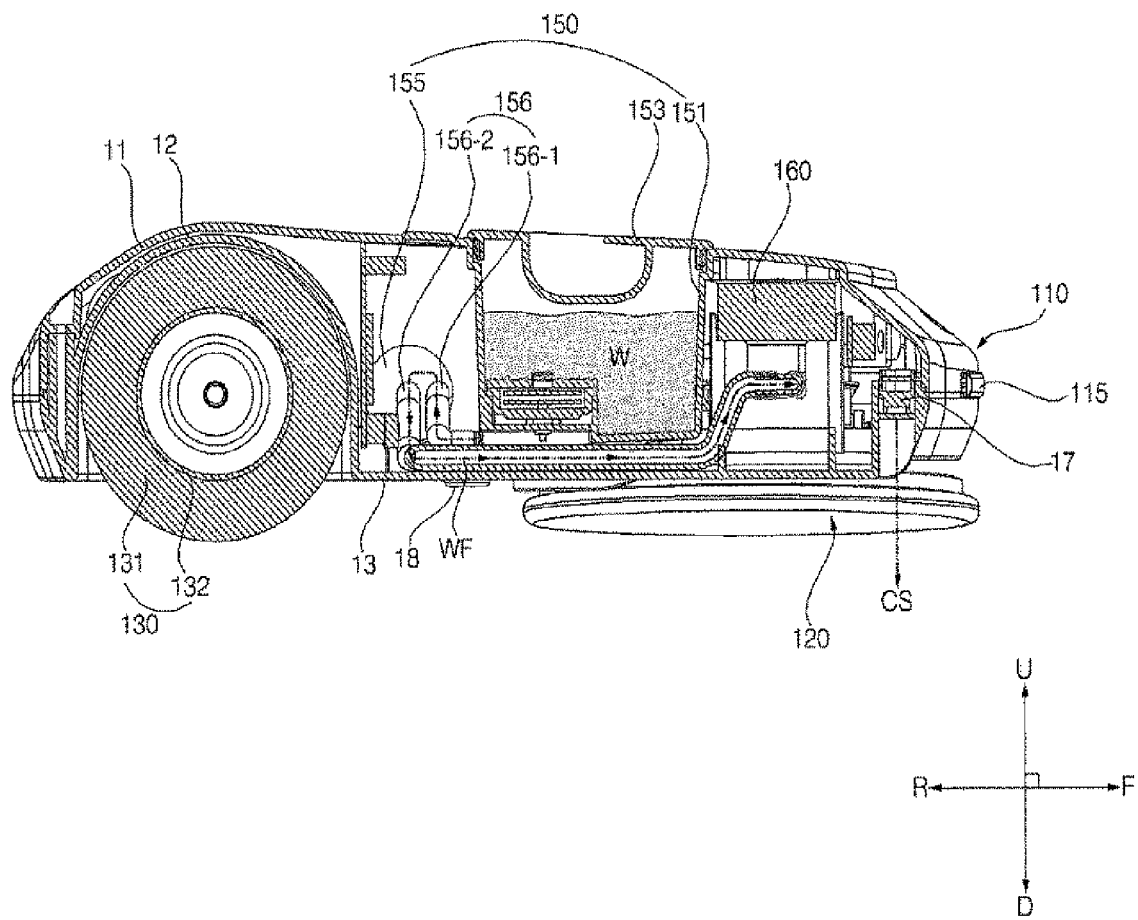
FIG. 11 is a vertical cross-sectional view of the cleaner 100 taken along line S4-S4' of FIG. 6.

The cleaner 100 includes a cliff sensor 17, which senses the presence or absence of a cliff on the floor within a cleaning zone. The cliff sensor 17 may include a plurality of cliff sensors 17a, 17b and 17c. The cliff sensor 17a may be disposed at the front of the spin-mop cleaning module 120 to sense the presence or absence of a cliff. The cliff sensors 17b and 17c may be disposed at the rear of the rolling-mop cleaning module 130 to sense the presence or absence of a cliff. Referring to FIG. 11, the cliff sensor 17 transmits a sensing signal in a downward direction CS to sense the presence or absence of a cliff at a corresponding position. The cliff sensor 17a senses the presence or absence of a cliff in the area at the front of the lowest points Pla and Plb of the spin-mop cleaning module 120. The cliff sensors 17b and 17c sense the presence or absence of a cliff in the area at the rear of the lowest point (the portion in contact with the floor) of the rolling-mop cleaning module 130.

The cleaner 100 may include a power switch (not illustrated) for inputting the ON/OFF of the supply of power. The cleaner 100 may include an input unit (not illustrated) capable of inputting various user instructions. The cleaner 100 may include a communication module (not illustrated) for performing communication with an external device.

The cleaner 100 includes an ultraviolet LED 18, which emits ultraviolet light downward. The ultraviolet LED 18 is disposed between the spin-mop cleaning module 120 and the rolling-mop cleaning module 130. The ultraviolet LED 18 is disposed on the lower surface of the body 110 to outwardly emit ultraviolet light to the floor surface. The ultraviolet LED 18 is disposed on the lower surface of the base 13. The ultraviolet LED 18 may include a plurality of ultraviolet LEDs 18a and 18b. The ultraviolet LEDs 18a and 18b include an ultraviolet LED 18a disposed between the left spin mop 120a and the rolling mop 130a and an ultraviolet LED 18b disposed between the right spin mop 120b and the rolling mop 130a.

The cleaner 100 may include a communication module (not illustrated), which is connectable to a predetermined network. Depending on the communication protocol, the communication module may be implemented using a wireless communication technique such as IEEE 802.11 WLAN, IEEE 802.15 WPAN, UWB, Wi-Fi, ZigBee, Z-wave, or Blue-tooth. For example, the communication module may include an ultra-wideband (UWB) communication sensor or the like to recognize the current position of the cleaner 100 in a room.

The cleaner 100 may include an inertial sensor unit (IMU) (not illustrated). The cleaner 100 may stabilize driving motion based on information of the inertial sensor unit.

The cleaner 100 includes the controller 20, which controls autonomous driving. The controller 20 may process a sensing signal of the obstacle sensor 16 or the cliff sensor 17. The controller 20 may process a sensing signal of the UWB sensor and the inertial sensor unit. The controller 20 may process a signal of the input unit or a signal input via the communication module. The controller 20 includes a printed circuit board (PCB) 20 disposed inside the body 110 (see FIGS. 12A and 12B).

The body 110 defines the external appearance of the cleaner. The body 110 includes a first section 111 disposed at the upper side of the spin-mop cleaning module 120 and a second section 112 disposed at the upper side of the rolling-mop cleaning module 130 (see FIG. 5). The first section 111 and the second section 112 are integrally formed with each other. The lower surface of the body 110 between the spin-mop cleaning module 120 and the rolling-mop cleaning module 130 is recessed upward to form a body gap 110c. The body gap 110c may be disposed between the first section 111 and the second section 112. The body gap 110c may be recessed in each of the left and right surfaces of the body 110.

The body 110 includes a bumper 115, which senses external shocks. The bumper 115 is disposed at the upper side of the rotating plate 122 of the spin-mop cleaning module 120. The bumper 115 is disposed at the front lateral side of the body 110. The bumper 115 includes a plurality of bumpers 115a and 115b. The bumper 115a is disposed at the front left side of the left spin-mop 120a, and the bumper 115b is disposed at the front right side of the right spin-mop 120b.

The cleaner 100 includes a contact piece 1151, which is disposed on the edge of the body 110 so as to come into contact with an external object. The contact piece 1151 is shaped so as to bend from the front side to the lateral side. The cleaner 100 includes a bumper switch 1152, which is provided to sense that the contact piece 1151 is pushed by an external object. The bumper switch 1152 may be provided so as to be pushed by the contact piece 1151 as the contact piece 1151 is moved. The bumper switch 1152 may include a first bumper switch 1152a, which is disposed on the back of a front portion of the contact piece 1151. The bumper switch 1152 may include a second bumper switch 1152b, which is disposed inside a lateral portion of the contact piece 1151. When the bumper switch 1152 is pushed rearward, the first bumper switch 1152a is pushed. When the bumper switch 1152 is pushed laterally, the second bumper switch 1152b is pushed.

The body 110 includes the case 11 and the base 13, which define the external appearance of the cleaner. The base 13 may further include a support member 13a.

Referring to FIGS. 2 to 6 and FIGS. 9 to 12B, the rolling-mop cleaning module 130 is provided so as to be in contact with the floor at the rear of the spin-mop cleaning module 120. The rolling-mop cleaning module 130 is provided to perform mopping in contact with the floor along with the movement of the body 110. The rolling-mop cleaning module 130 is provided to perform dry mopping.

The rolling-mop cleaning module 130 may include the rolling mop 130a, which rotates about a horizontally extending rotational axis Or. In the present embodiment, the rotational axis Or extends in the transverse direction, but, in another embodiment, the rotational axis Or may extend in the longitudinal direction, or may extend in A direction between the transverse direction and the longitudinal direction.

In the present embodiment, the rolling-mop cleaning module 130 includes the rolling mop 130a, which rotates about the rotational axis Or, which extends in the transverse direction. The rolling mop 130a may rotate about the rotational axis Or, which extends in a direction parallel to the direction in which the left spin mop 120a and the right spin mop 120b are arranged.

Figure 6:
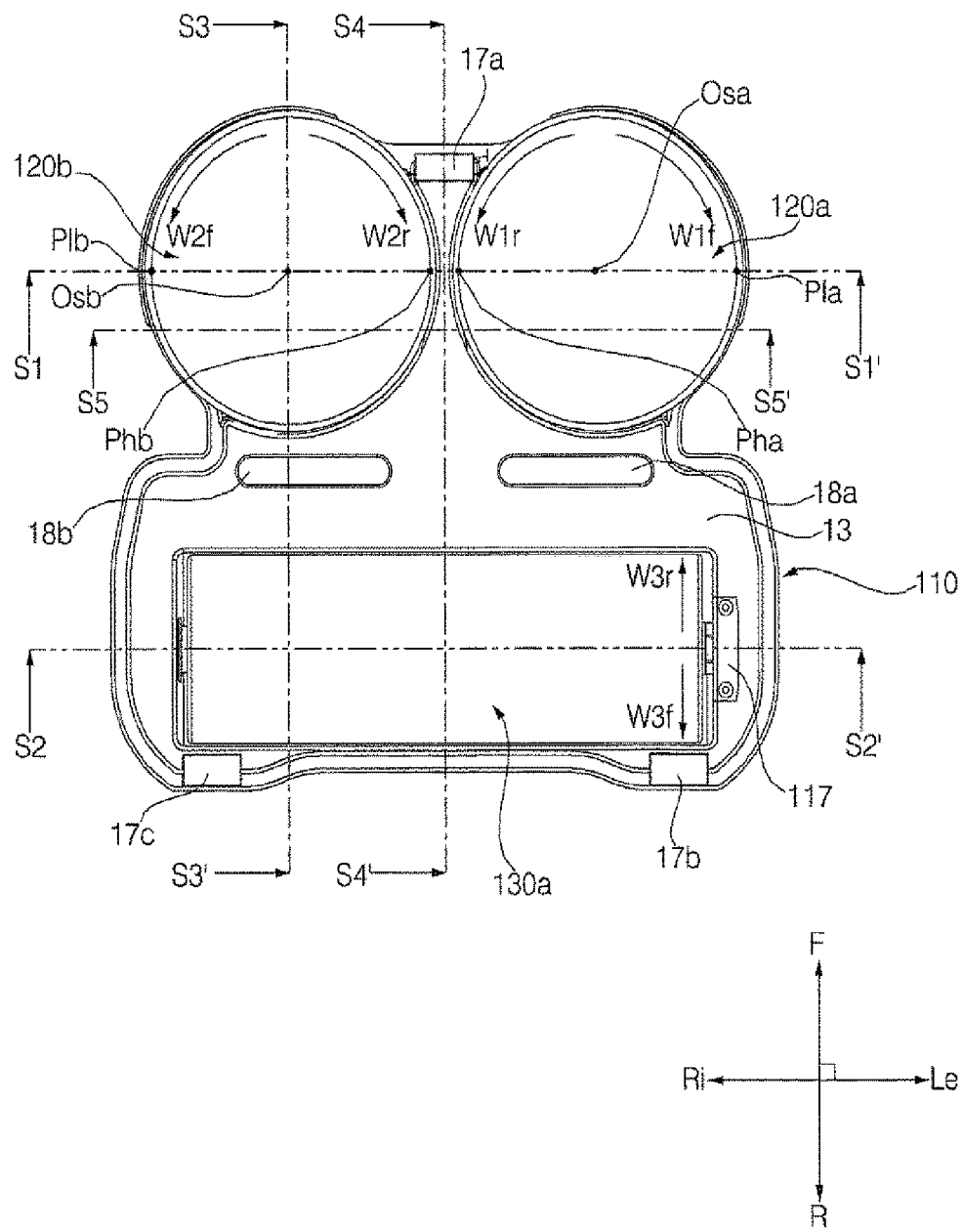
FIG. 6 is a bottom view of the cleaner 100 of FIG. 1.
Figure 7:
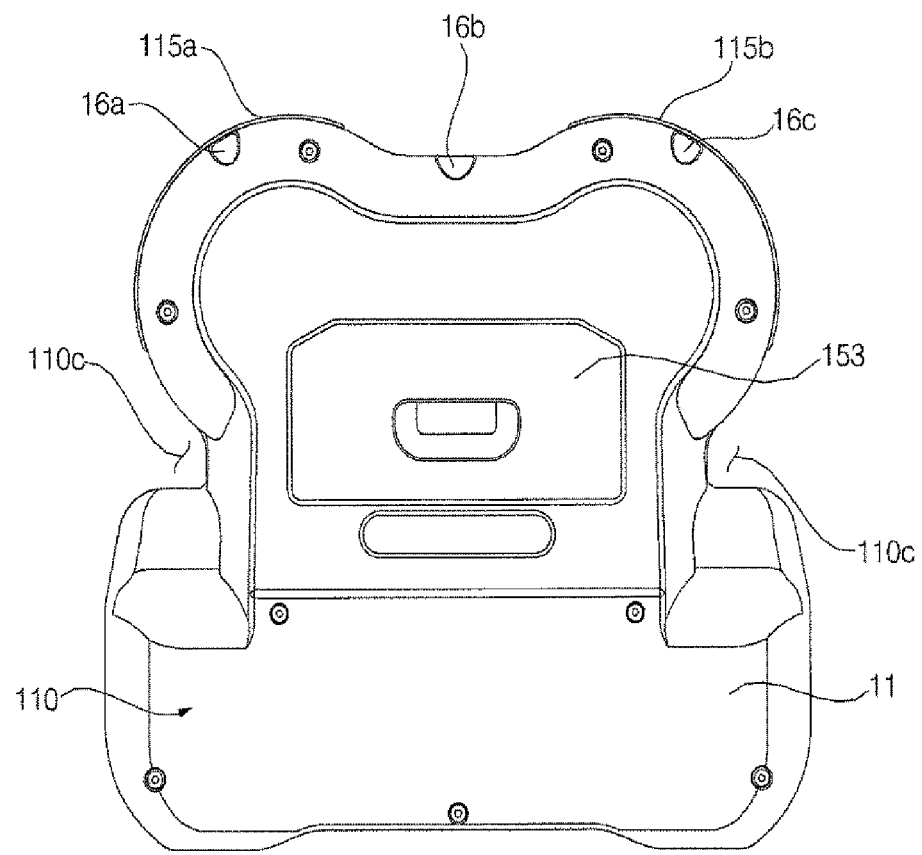
FIG. 7 is a top view of the cleaner 100 of FIG. 1.
Figure 7:
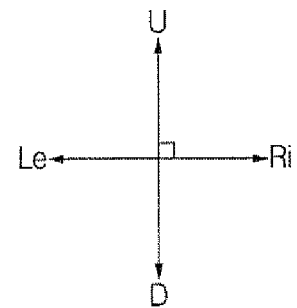
Figure 8:
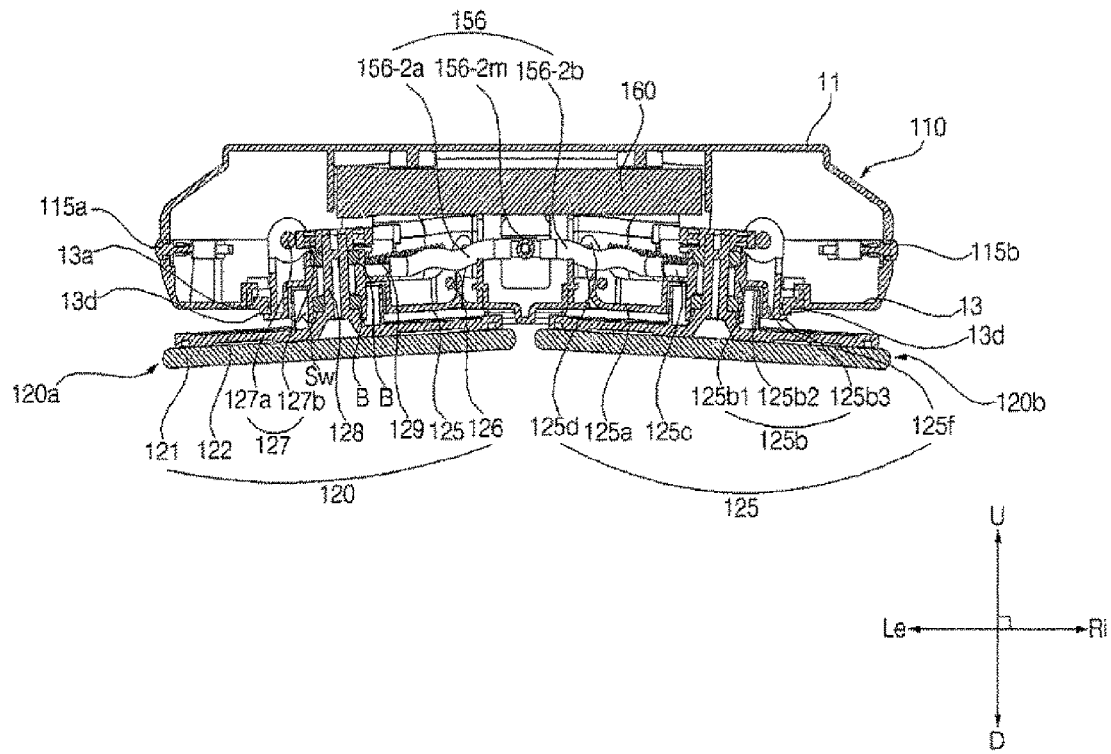
FIG. 8 is a vertical cross-sectional view of the cleaner 100 taken along line S1-S1' of FIG. 6.
Figure 9:
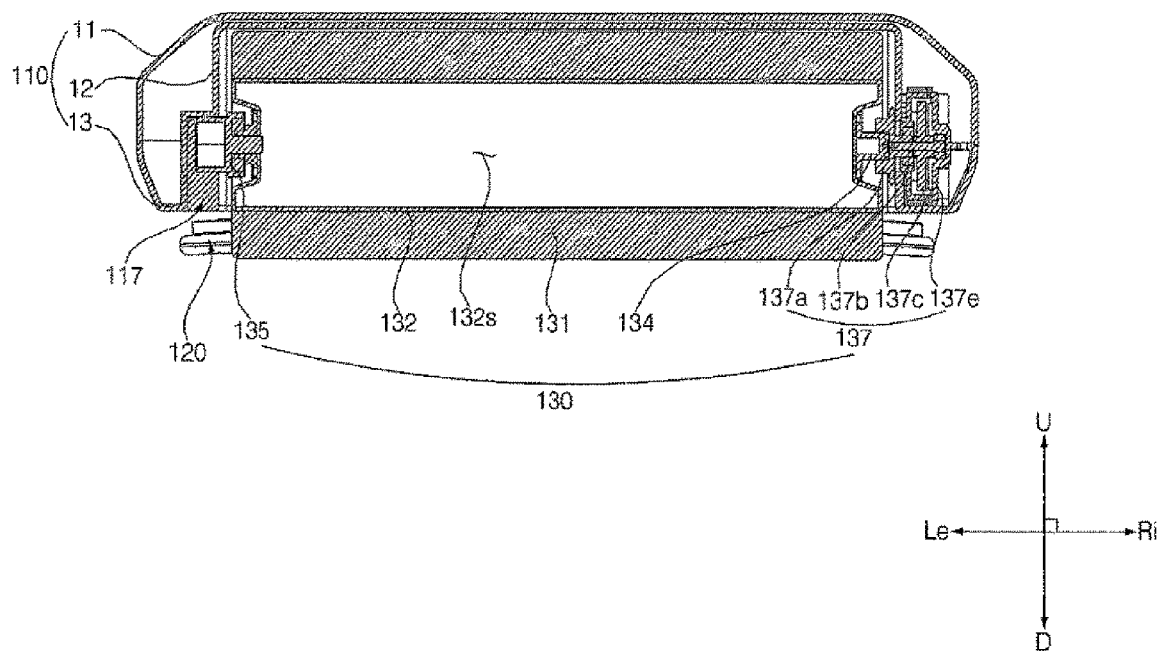
FIG. 9 is a vertical cross-sectional view of the cleaner 100 taken along line S2-S2' of FIG. 6.
Figure 10:
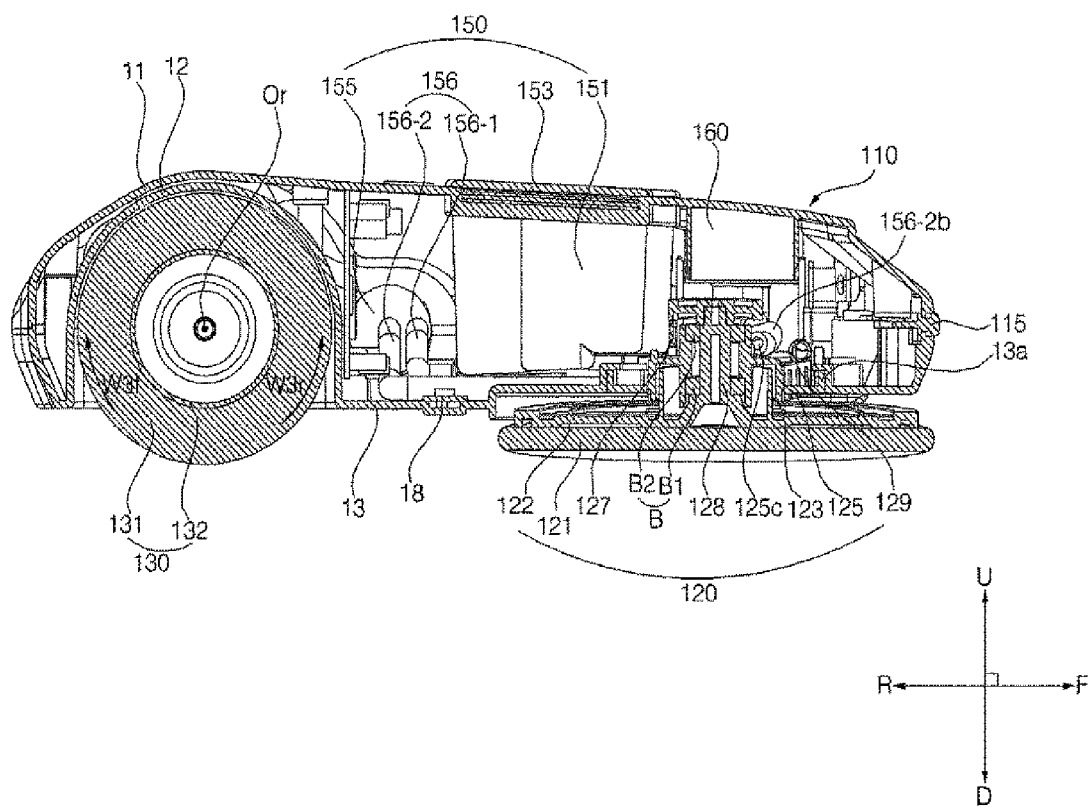
FIG. 10 is a vertical cross-sectional view of the cleaner 100 taken along line S3-S3' of FIG. 6.

Referring to FIGS. 6 and 10, among the rotation directions of the rolling mop 130a when viewed from the right side, the clockwise direction is defined as a third forward direction w3f, and the counterclockwise direction is defined as a third reverse direction w3r.

When the cleaner 100 moves forward, the rolling mop 130a performs mopping while following the floor surface that has been cleaned by the spin-mop cleaning module 120. The rolling mop 130a may perform dry mopping, and may remove moisture from the floor surface that has undergone wet mopping by the left spin mop 120a and the right spin mop 120b. In the present embodiment, the rolling-mop cleaning module 130 includes a single rolling mop 130a, but, in another embodiment, the rolling-mop cleaning module 130 may include a plurality of rolling mops. The plurality of rolling mops may respectively rotate about a plurality of rotational axes, which are parallel to each other.

The rolling-mop cleaning module 130 includes a mop unit 131. A part of the weight of the body 110 is transmitted to the floor through the mop unit 131. The mop unit 131 is disposed so as to surround the periphery of a rotating member 132. The mop unit 131 is disposed along the periphery about the rotational axis Or. The mop unit 131 may be fixedly coupled to the rotating member 132, or may be separably fixed to the rotating member 132.

The rolling-mop cleaning module 130 includes the rotating member 132, which is rotatably provided. The rotating member 132 serves to fix the mop unit 131 of the rolling mop 130a. The rotating member 132 may be integrally rotated with the mop unit 131. The rotating member 132 rotates upon receiving drive force of a rolling-drive unit 137. The rotating member 132 rotates about the rotational axis Or.

The rotating member 132 has a cylindrical shape. The rotating member 132 is elongated in the direction in which the rotational axis Or extends. The rotating member 132 defines therein a hollow region 132s. The mop unit 131 is fixed to the outer peripheral surface of the rotating member 132.

The rolling-mop cleaning module 130 includes a first shaft portion 134, which is disposed on one end of the rotating member 132. The rolling-mop cleaning module 130 includes a second shaft portion 135, which is disposed on the other end of the rotating member 132. The first shaft portion 134 and the second shaft portion 135 are disposed respectively on opposite ends of the rolling-mop cleaning module 130 in the extending direction of the rotational axis Or. In the present embodiment, the first shaft portion 134 is disposed on the right end of the rotating member 132, and the second shaft portion 135 is disposed on the left end of the rotating member 132. One end of the rotating member 132 is inwardly recessed, and the first shaft portion 134 is disposed in the recessed portion of the one end of the rotating member 132. The other end of the rotating member 132 is inwardly recessed, and the second shaft portion 135 is disposed in the recessed portion of the other end of the rotating member 132.

The first shaft portion 134 interconnects one end of the rotating member 132 and the body 110. The first shaft portion 134 is fixedly connected to the rotating member 132. The first shaft portion 134 is formed so as to protrude in the direction of the rotational axis Or. In the present embodiment, the first shaft portion 134 protrudes rightward. The first shaft portion 134 is inserted into a recess formed in a drive force transmitter 137a so as to integrally rotate when the drive force transmitter 137a rotates. The cross section of the first shaft portion 134, which is perpendicular to the rotational axis Or, has a shape (e.g. a polygonal shape) other than a circular shape, and the recess in the drive force transmitter 137a is recessed into a shape corresponding to the first shaft portion 134.

The second shaft portion 135 interconnects the other end of the rotating member 132 and the body 110. The second shaft portion 135 is rotatably connected to the rotating member 132. The second shaft portion 135 is formed so as to protrude in the direction of the rotational axis Or. In the present embodiment, the second shaft portion 135 protrudes leftward. The second shaft portion 135 is inserted into and fixed to recesses formed in the body 110 and a coupler 117. When the first shaft portion 134 is rotated by the drive force transmitter 137a, the rotating member 132 and the mop unit 131 integrally rotate with the first shaft portion 134, and the second shaft portion 135 is fixed so as to rotate relative to the rotating member 132. A bearing may be disposed between the second shaft portion 135 and the rotating member 132. The cross section of the second shaft portion 135, which is perpendicular to the rotational axis Or, has a shape (e.g. a polygonal shape) other than a circular shape, and the recess in the body 110 and/or the coupler 117 is recessed into a shape corresponding to the second shaft portion 135.

The rolling-mop cleaning module 130 includes the rolling-drive unit 137, which provides drive force for the rotation of the rolling mop 130a. The rolling-drive unit 137 provides drive force to rotate the rotating member 132. The rolling-drive unit 137 includes a motor 137d. The motor 137d is disposed inside the body 110. The rolling-drive unit 137 includes a gear assembly 137c, which transmits the torque of the motor 137d. The gear assembly 137c includes a plurality of gears, which are engaged and rotated with each other. For example, the plurality of gears may include a driving gear, which integrally rotates with a shaft of the motor 137d, and a driven gear, which is engaged and rotated with the driving gear. A plurality of driven gears may be provided so as to be engaged and rotated with each other. The rolling-drive unit 137 may include a shaft 137b, which integrally rotates with any one driven gear. The rolling-drive unit 137 may include the drive force transmitter 137a, which transmits the torque to the first shaft portion 134. The shaft 137b transmits the torque of the corresponding driven gear to the drive force transmitter 137a. The drive force transmitter 137a has the recess into which the first shaft portion 134 is inserted. The shaft 137b, the drive force transmitter 137a, and the first shaft portion 134 integrally rotate with each other.

The cleaner 100 may include the coupler 117, which is separably coupled to the body 110. The coupler 117 is disposed on the base 13. The coupler 117 supports the lower end of the second shaft portion 135. The second shaft portion 135 is supported by the base 13. The second shaft portion 135 may have the recess into which the second shaft portion 135 is inserted. The rotating member 132 and the mop unit 131 may be removed from the body 110, or may be coupled to the body 110, using the coupler 117. For example, in the state in which the coupler 117 is removed, one of opposite ends of the rotating member 132, on which the second shaft portion 135 is disposed, may be pulled out of the body 110, and then the first shaft portion 134 may be easily pulled out from the drive force transmitter 137a. On the contrary, in the state in which the coupler 117 is removed, the distal end of the first shaft portion 134 may first be inserted into the recess in the drive force transmitter 137a, and then the second shaft portion 135 and the coupler 117 may be inserted into the body 110. In order to maintain the state in which the rotating member 132 is coupled to the body 110, the user may fix the coupler 117 to the body 110. In addition, in order to separate the rotating member 132 from the body 110, the user may separate the coupler 117 from the body 110.

Referring to FIGS. 1 to 6, FIG. 8, and FIGS. 10 to 14, the spin-mop cleaning module 120 includes the left spin mop 120a and the right spin mop 120b, which are in contact with the floor while rotating in the clockwise direction or in the counterclockwise direction when viewed from the upper side. The spin-mop cleaning module 120 is provided to perform mopping via rotation of the left spin mop 120a and the right spin mop 120b.

Among the components of the spin-mop cleaning module 120, a component in which "left" is affixed to the front of the name thereof is a component of the left spin-mop module 120-1, and a component in which "right" is affixed to the front of the name thereof is a component for operating the right spin-mop module 120-2. In a description related to the components of the spin-mop cleaning module 120, when it is unnecessary to distinguish "left" and "right" from each other, the corresponding description may be applied to both "left" and "right".

Referring to FIG. 6, the point at which the rotational axis of the left spin mop 120a and the lower surface of the left spin mop 120a cross each other is defined as the rotation center Osa of the left spin mop 120a, and the point at which the rotational axis of the right spin mop 120b and the lower surface of the right spin mop 120b cross each other is defined as the rotation center Osb of the right spin mop 120b. Among the rotation directions of the left spin mop 120a when viewed from the lower side, the clockwise direction is defined as a first forward direction w1f, and the counterclockwise direction is defined as a first reverse direction w1r. Among the rotation directions of the right spin mop 120b when viewed from the lower side, the counterclockwise direction is defined as a second forward direction w2f, and the clockwise direction is defined as a second reverse direction w2r.

Referring to FIG. 6, when the left spin mop 120a rotates, the point Pla on the lower surface of the left spin mop 120a, which receives the largest frictional force from the floor, is disposed on the left side of the rotation center Osa of the left spin mop 120a. A greater weight may be transmitted to the floor surface from the point Pla on the lower surface of the left spin mop 120a than at any other point so as to generate the largest friction force at the point Pla. In the present embodiment, the point Pla is disposed directly to the left of the rotation center Osa, but, in another embodiment, the point Pla may be disposed leftward and to the front side or the rear side of the rotation center Osa.

Referring to FIG. 6, when the right spin mop 120b rotates, the point Plb on the lower surface of the right spin mop 120b, which receives the largest frictional force from the floor, is disposed on the right side of the rotation center Osb of the right spin mop 120b. A greater weight may be transmitted to the floor surface from the point Plb on the lower surface of the right spin mop 120b than at any other point so as to generate the largest friction force at the point Plb. In the present embodiment, the point Plb is disposed directly to the right of the rotation center Osb, but, in another embodiment, the point Plb may be disposed rightward and to the front side or the rear side of the rotation center Osb.

The point Pla and the point Plb are bilaterally symmetrically disposed to each other.

In order to make the point Pla be the point on the lower surface of the left spin mop 120a that receives the largest frictional force from the floor (or to make the point Plb be the point on the lower surface of the right spin mop 120b that receives the largest frictional force from the floor), various embodiments may be implemented as follows.

Figure 3A:
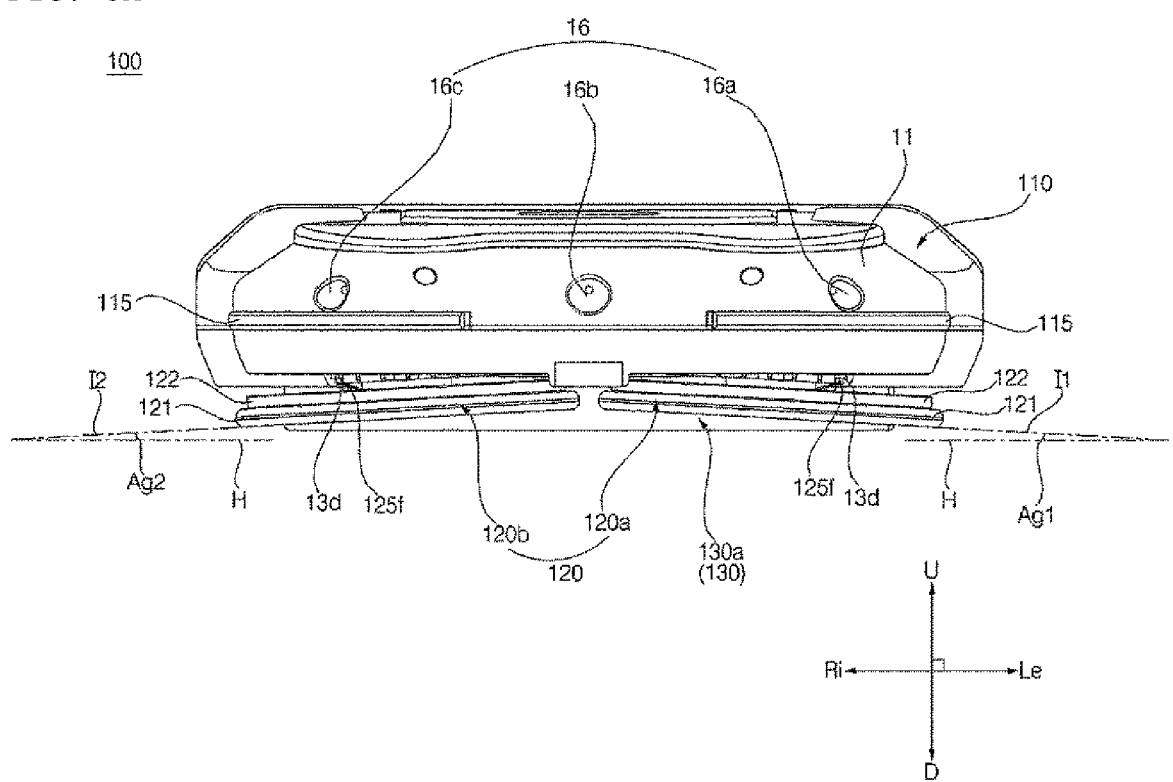
FIG. 3A is a front elevational view of the cleaner 100 of FIG. 1.

In an embodiment with reference to FIG. 3A, the lower surface of the left spin mop 120a may be disposed so as to be inclined downward in the direction from the rotation center Osa to the point Pla. In this case, the point Pla is the lowest point Pla on the lower surface of the left spin mop 120a. In this case, "the angle of the lower surface I1 of the left spin mop 120a relative to the virtual horizontal plane H" and "the angle of the lower surface I2 of the right spin mop 120b relative to the virtual horizontal plane H" are defined as inclination angles Ag1 and Ag2. The angle of the lower surface I1 of the left spin mop 120a relative to the external horizontal plane H is the inclination angle Ag1, and the angle of the lower surface I2 of the right spin mop 120b relative to the external horizontal plane H is the inclination angle Ag2. The two inclination angles Ag1 and Ag2 may be the same.

Figure 3B:
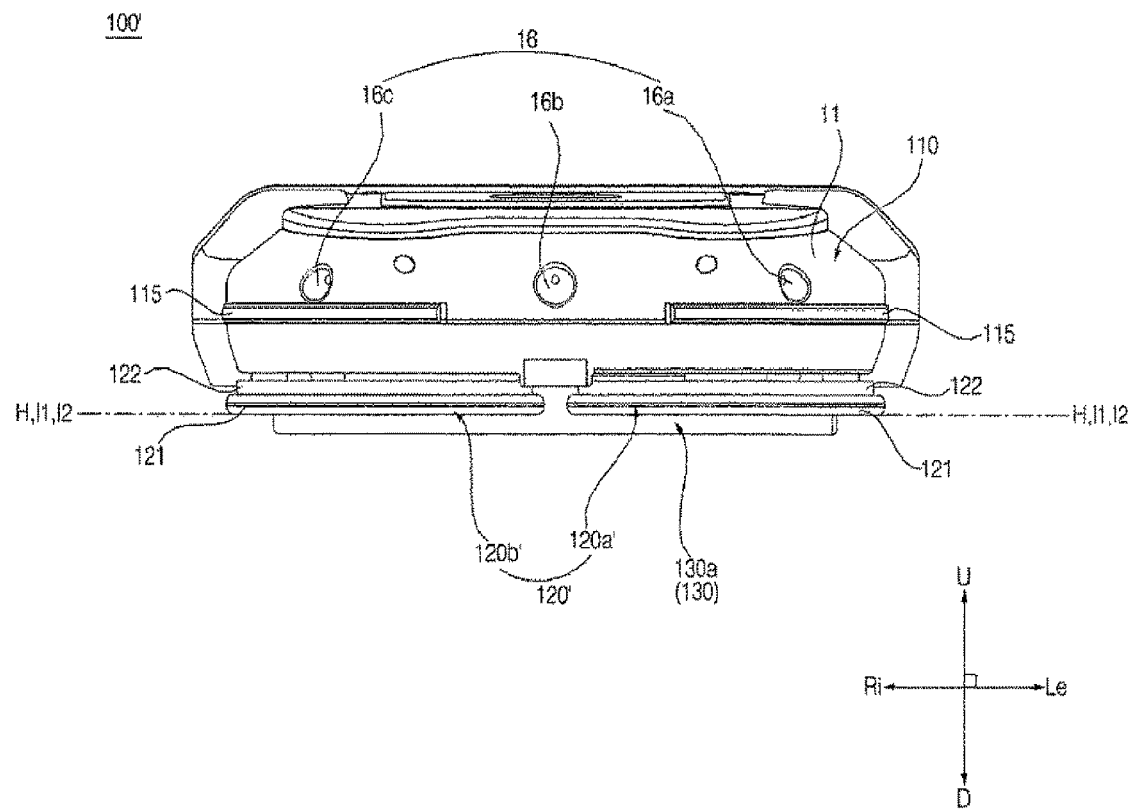
FIG. 3B is a front elevational view of a cleaner 100' according to another embodiment of the present invention.
Figure 4:
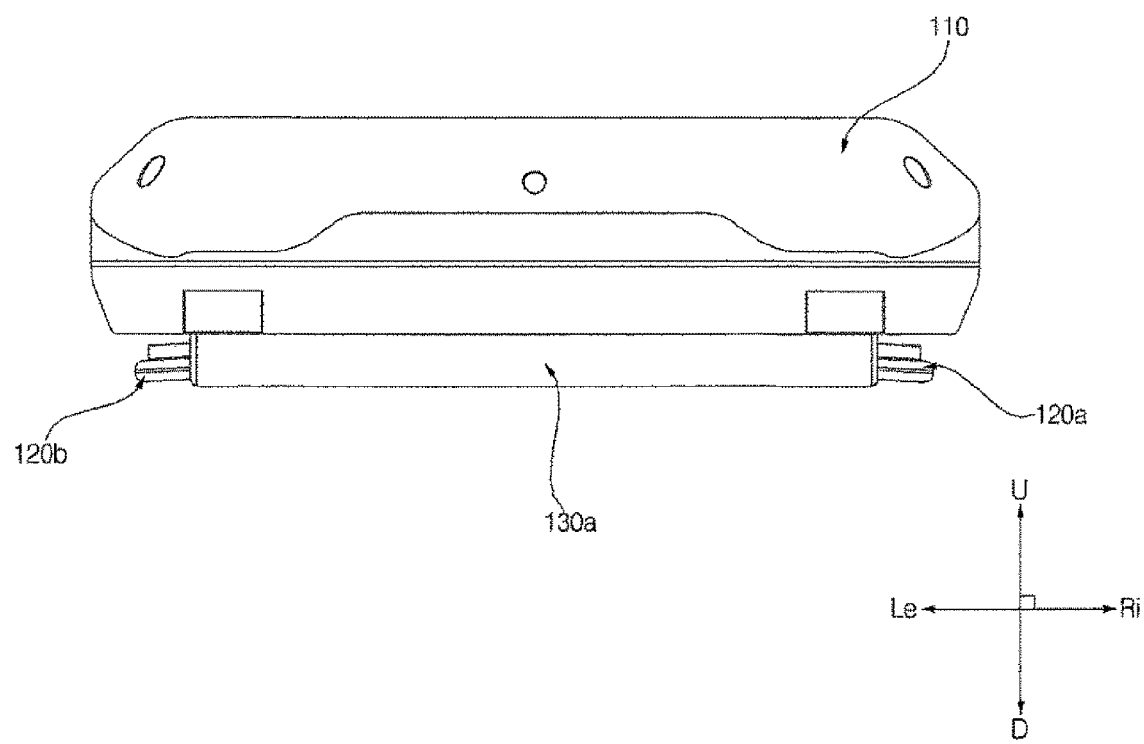
FIG. 4 is a rear elevational view of the cleaner 100 of FIG. 1.
Figure 5:
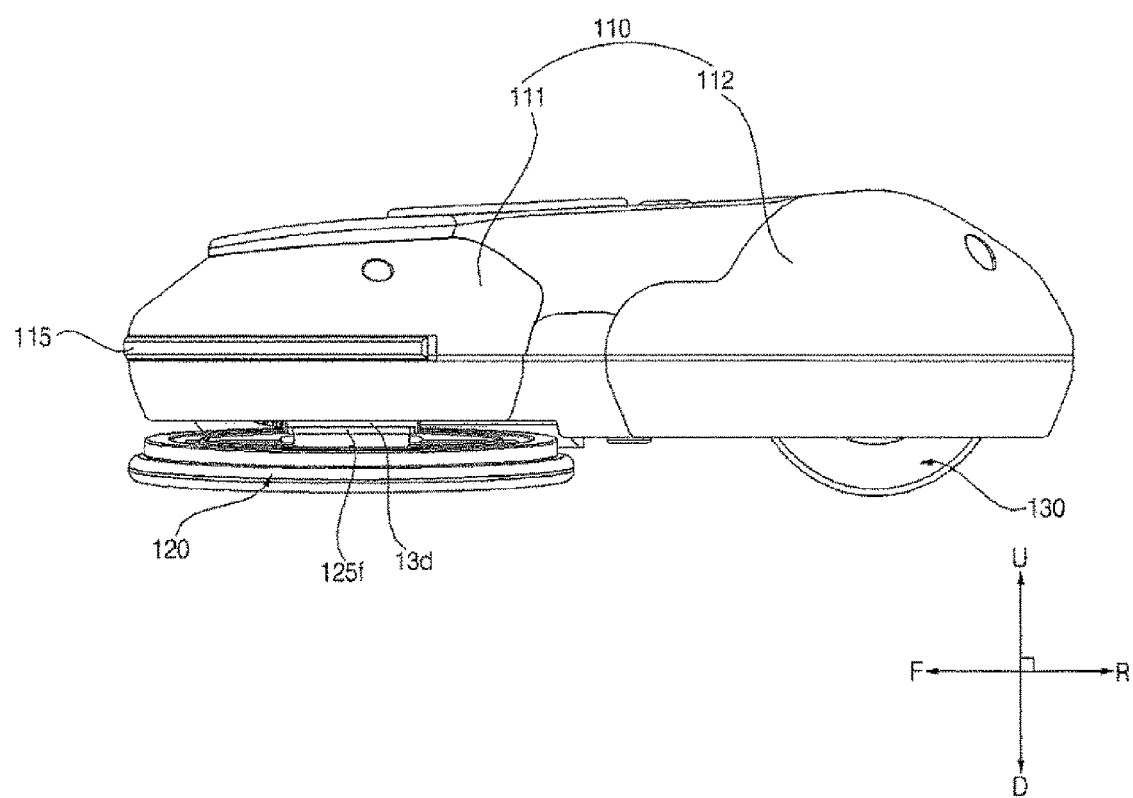
FIG. 5 is a (left) side elevational view of the cleaner 100 of FIG. 1.

In an embodiment with reference to FIG. 3B, the lower surface of the left spin mop 120a may be horizontally disposed. Through the use of an elastic member, a moment may be applied to the left spin mop 120a. The moment applied to the left spin mop 120a is a clockwise moment when viewed from the front side. In this case, even if the left spin mop 120a is horizontally disposed relative to the external horizontal plane H, the point Pla is most strongly close contact with the external horizontal plane H, thereby generating the largest frictional force. First and second concrete embodiments for this are as follows.

In the first embodiment, the spin-mop cleaning module 120 may be disposed on the tilting frame 125, which will be described below, and the moment may be applied to the spin-mop cleaning module 120 by the elastic force of the elastic member 129, which will be described below. As illustrated in FIG. 3B, the lower surface of the spin mop 120a or 120b is disposed parallel to the horizontal plane H in the state in which an upper-end-limit contact portion 125f is in contact with an upper-end limit 13d. Specifically, the elastic member 129 is most largely elastically deformed in the horizontal state of the left spin mop 120a, and the degree of elastic deformation of the elastic member 129 is reduced in the state in which the point Pla of the left spin mop 120a is located lower than any other point.

In the second embodiment, a plurality of springs (not illustrated) may be arranged in the rotation direction about the rotational axis on the upper surface of a lower rotating plate (not illustrated), to which the lower surface of the left spin mop 120a is fixed. In this case, an upper rotating plate (not illustrated), which supports the upper ends of the respective springs, may be disposed so as to be inclined downward in the direction from the rotation center Osa to the point Pla. When the upper rotating plate rotates, the springs also rotate and repeat elastic compression and elastic restoration respectively. At this time, among the plurality of springs, the spring disposed toward the point Pla on the basis of the rotation center Osa is compressed to the largest extent, and thus the point Pla on the lower surface of the left spin mop 120a receives the largest frictional force from the floor.

In order to make the point Plb on the lower surface of the right spin mop 120b be the point that receives the largest frictional force from the floor, the above-described embodiment, the first embodiment, and the second embodiment may be applied in the same manner by those skilled in the art. Hereinafter, a description will be made with reference to the above-described embodiment (see FIG. 3A).

The lower surface of the left spin mop 120a and the lower surface of the right spin mop 120b are disposed so as to be inclined respectively. The inclination angle Ag1 of the left spin mop 120a and the inclination angle Ag2 of the right spin mop 120b are acute angles. In the present embodiment, the inclination angles Ag1 and Ag2 are respectively about 3~6 degrees. The inclination angles Ag1 and Ag2 may be set to a small value required to cause the entire lower surface of the mop unit 121 to be brought into contact with the floor via rotation of the left spin mop 120a and the right spin mop 120b while ensuring that the largest frictional force point is the point Pla or Plb.

The lower surface of the left spin mop 120a may be inclined downward and leftward. The lower surface of the right spin mop 120b may be inclined downward and rightward. Referring to FIG. 6, the lowest point Pla is formed on the left portion of the lower surface of the left spin mop 120a. The highest point Pha is formed on the right portion of the lower surface of the left spin mop 120a. The lowest point Plb is formed on the right portion of the lower surface of the right spin mop 120b. The highest point Phb is formed on the left portion of the lower surface of the right spin mop 120b.

Referring to FIG. 6, the movement of the cleaner 100 is realized by the frictional force generated between the spin-mop cleaning module 120 and/or the rolling-mop cleaning module 130 and the floor.

The spin-mop cleaning module 120 may generate "forward movement frictional force" to move the body 110 forward or "rearward movement frictional force" to move the body 110 rearward. The spin-mop cleaning module 120 may generate "leftward moment frictional force" to turn the body 110 to the left or "rightward moment frictional force" to turn the body 110 to the right. The spin-mop cleaning module 120 may generate the combined frictional force of any one of the forward movement frictional force and the rearward movement frictional force and any one of the leftward moment frictional force and the rightward moment frictional force.

The rolling-mop cleaning module 130 may generate "forward movement frictional force" to move the body 110 forward or "rearward movement frictional force" to move the body 110 rearward.

In order for the spin-mop cleaning module 120 to generate the forward movement frictional force, the left spin mop 120a may be rotated in the first forward direction w1f by a predetermined rpm R1, and the right spin mop 120b may be rotated in the second forward direction w2f by the predetermined rpm R1.

In order for the rolling-mop cleaning module 130 to generate the forward movement frictional force, the rolling-mop 130a may be rotated in the third forward direction w3f.

In order for the spin-mop cleaning module 120 to generate the rearward movement frictional force, the left spin mop 120a may be rotated in the first reverse direction w1r by a predetermined rpm R2, and the right spin mop 120b may be rotated in the second reverse direction w2r by the predetermined rpm R2.

In order for the rolling-mop cleaning module 130 to generate the rearward movement frictional force, the rolling-mop 130a may be rotated in the third reverse direction w3r.

In order for the spin-mop cleaning module 120 to generate the rightward moment frictional force, the left spin mop 120a may be rotated in the first forward direction w1f by a predetermined rpm R3, and the right spin mop 120b may be operated as follows: (i) it may be rotated in the second reverse direction w2r; (ii) it may be stopped without rotation; or (iii) it may be rotated in the second forward direction w2f by a predetermined rpm R4, which is smaller than the rpm R3.

In order for the spin-mop cleaning module 120 to generate the leftward moment frictional force, the right spin mop 120b may be rotated in the second forward direction w2f by a predetermined rpm R5, and the left spin mop 120a may be operated as follows: (i) it may be rotated in the first reverse direction w1r; (ii) it may be stopped without rotation; or (iii) it may be rotated in the first forward direction w1f by a predetermined rpm R6, which is smaller than the rpm R5.

The body 110 may be moved by the combined frictional force of the frictional force generated by the spin-mop cleaning module 120 and the frictional force generated by the rolling-mop cleaning module 130. In addition, the body 110 may be positioned in place by the combined frictional force of the frictional force generated by the spin-mop cleaning module 120 and the frictional force generated by the rolling-mop cleaning module 130.

Referring to FIG. 3A and FIGS. 31 to 33, the inclination angle Ag1 or Ag2 of the lower surface of at least one spin mop 120a or 120b relative to the horizontal plane H is changeable. The inclination angle Ag1 of the lower surface of the left spin mop 120a relative to the horizontal plane H is changeable. The inclination angle Ag2 of the lower surface of the right spin mop 120b relative to the horizontal plane H is changeable. As the spin-mop cleaning module 120 rotates about a tilting rotational axis Ot, the inclination angles of the lower surfaces of the spin mops 120a and 120b relative to the horizontal plane H are changeable. Thereby, even when the floor surface to be mopped has a curvature, the spin mops may exert a suspension function, may stably support the body, and may thoroughly mop even the curved floor surface.

The at least one spin mop 120a or 120b is rotatable within a predetermined range about the horizontally extending tilting rotational axis Ot. The at least one spin mop 120a or 120b may be rotatable only within a predetermined range about the tilting rotational axis Ot. The left spin mop 120a is rotatable within a predetermined range about a horizontally extending left tilting rotational axis Ota. The right spin mop 120b is rotatable within a predetermined range about a horizontally extending right tilting rotational axis Ota.

The extending direction of the tilting rotational axis Ot includes a longitudinal line. Specifically, the tilting rotational axis Ot may extend in a direction between the transverse direction and the longitudinal direction, or may extend in the longitudinal direction as in the present embodiment.

The inclination angles Ag1 and Ag2 are changeable within a range from the maximum value Agmax and the minimum value Agmin. When viewed from the rear side, the inclination angle Ag1 of the left spin mop 120a reaches the minimum value Agmin in the state in which the left spin mop 120a rotates in the clockwise direction about the left tilting rotational axis Ota to the maximum extent, and reaches the maximum value Agmax in the state in which the left spin mop 120a rotates in the counterclockwise direction about the left tilting rotational axis Ota to the maximum extent. When viewed from the rear side, the inclination angle Ag1 of the right spin mop 120b reaches the minimum value Agmin in the state in which the right spin mop 120b rotates in the counterclockwise direction about the right tilting rotational axis Otb to the maximum extent, and reaches the maximum value Agmax in the state in which the right spin mop 120b rotates in the clockwise direction about the right tilting rotational axis Otb to the maximum extent.

Figure 31:
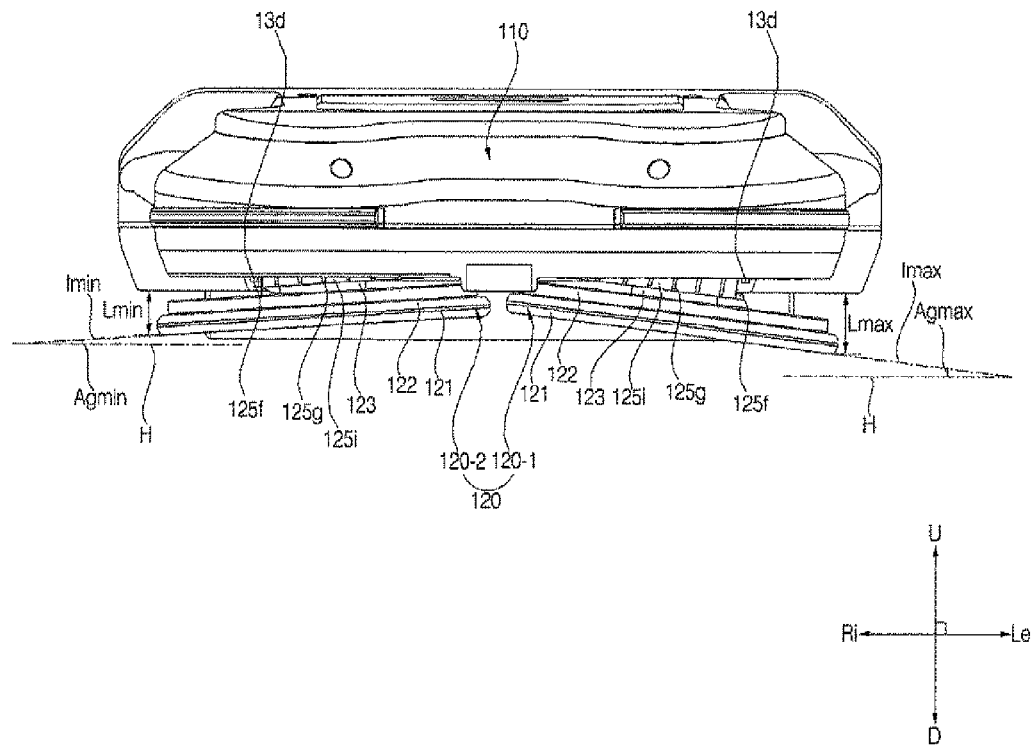
FIGS. 31 to 33 are views illustrating the state in which the inclination angle of the lower surface of the left spin mop 120a reaches the maximum value Agmax and the state in which the inclination angle of the lower surface of the right spin mop 120b reaches the maximum value Agmax, FIG. 31 being an elevational view of the cleaner 100 of FIG. 3A, FIG. 32 being a cross-sectional view of the cleaner 100 of FIGS. 6 and 13 taken along line S1-S1', and FIG. 33 being a cross-sectional view of the cleaner 100 of FIGS. 6 and 13 taken along line S5-S5'.
Figure 32:
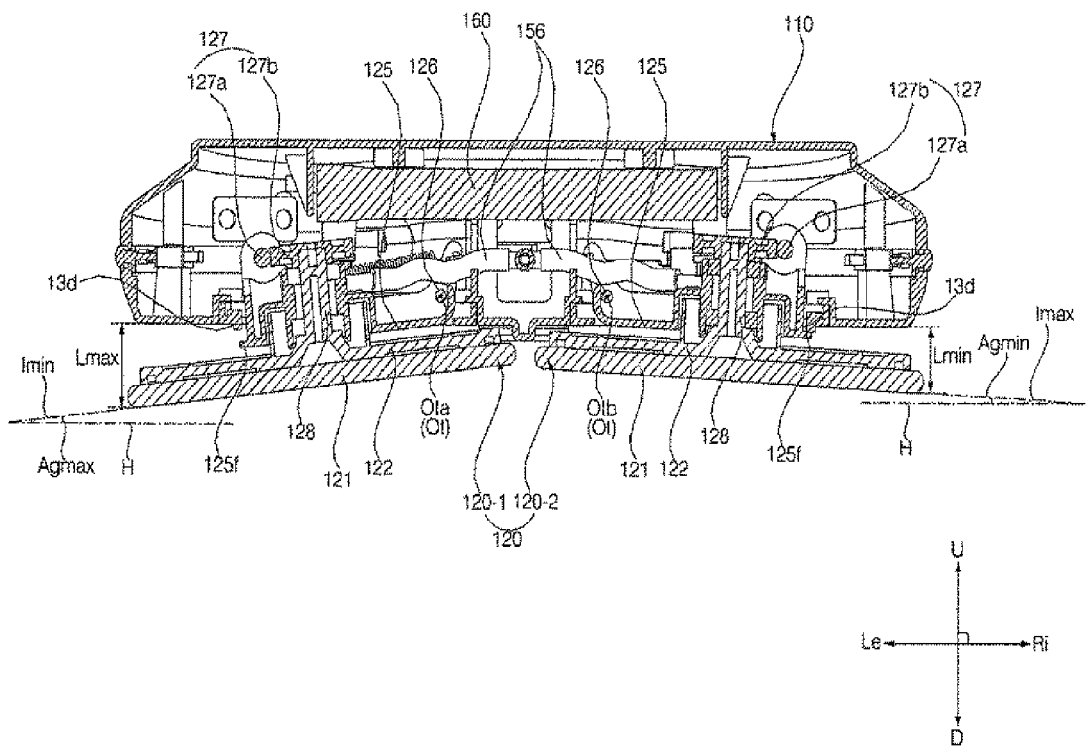
Figure 33:
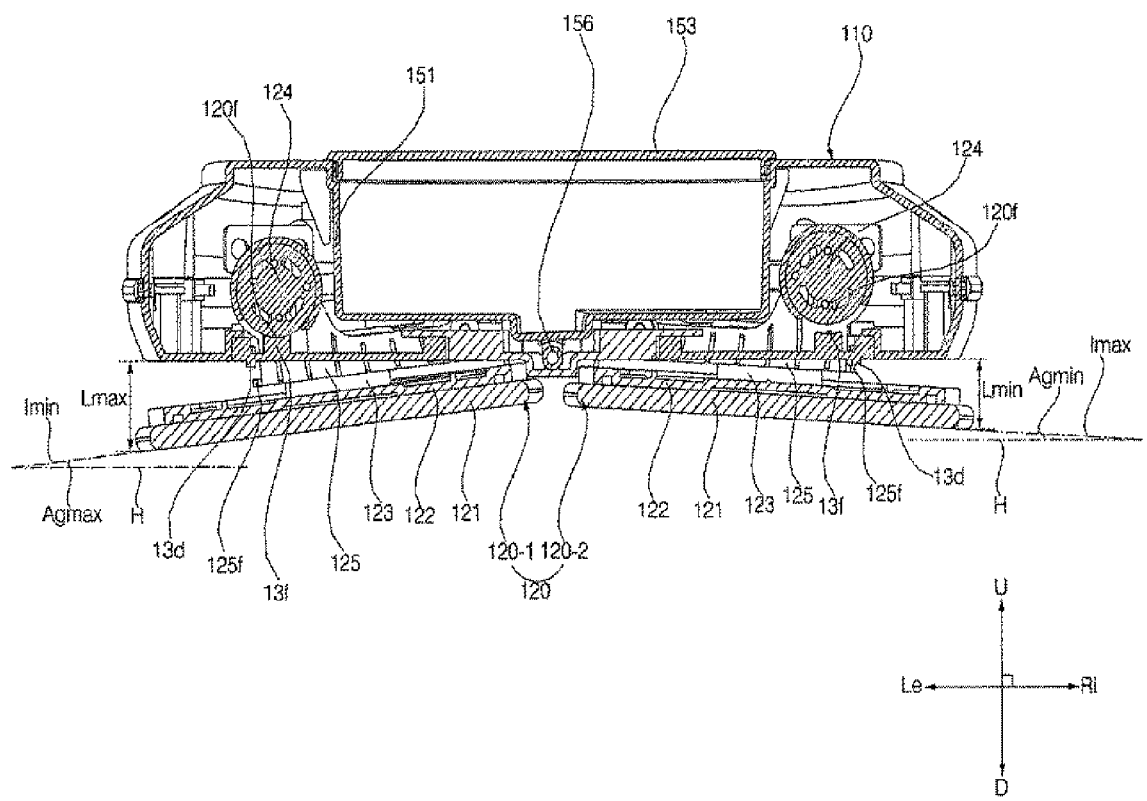

In FIGS. 31 to 33, the plane on which the lower surfaces of the spin mops 120a and 120b are disposed in the state in which the inclination angles Ag1 and Ag2 are minimized is designated by Imin, and the plane on which the lower surfaces of the spin mops 120a and 120b are disposed in the state in which the inclination angles Ag1 and Ag2 are maximized is designated by Imax. The angle between the plane Imin and the virtual horizontal plane H is illustrated as the minimum inclination angle Agmin, and the angle between the plane Imax and the virtual horizontal plane H is illustrated as the maximum inclination angle Agmax.

The distance L between at least a portion of the lower surface of the at least one spin mop 120a or 120b and the lower surface of the body 110 is changeable. When the inclination angle Ag1 or Ag2 of the lower surface of the at least one spin mop 120a or 120b is changed, the distance L between the lowest point P1a or P1b and the lower surface of the body 110 is also changed. In the state in which the inclination angles Ag1 and Ag2 reach the minimum value Agmin, the distance between the lowest point P1a or P1b and the lower surface of the body 110 reaches the minimum value Lmin. In the state in which the inclination angles Ag1 and Ag2 reach the maximum value Agmax, the distance between the lowest point P1a or P1b and the lower surface of the body 110 reaches the maximum value Lmax.

The left tilting rotational axis Ota and the right tilting rotational axis Otb may be bilaterally symmetrical to each other. The left tilting rotational axis Ota and the right tilting rotational axis Otb may be disposed at the middle in the transverse direction. The left tilting rotational axis Ota may be disposed on the right portion of a left tilting frame 125. The right tilting rotational axis Otb may be disposed on the left portion of a right tilting frame 125. The left tilting rotational axis Ota and the right tilting rotational axis Otb may be disposed parallel to each other.

The downwardly inclined direction of the lower surface of the left spin mop 120a and the downwardly inclined direction of the lower surface of the right spin mop 120b are bilaterally symmetrical to each other. In the present embodiment, the downwardly inclined direction of the lower surface of the left spin mop 120a is the left side, and the downwardly inclined direction of the lower surface of the right spin mop 120b is the right side. As such, when a portion of the floor surface, which is the support point of any one of the left spin mop 120a and the right spin mop 120b, is curved, the other spin mop may perform mopping normally, and the body 110 may be stably supported.

Figure 15:
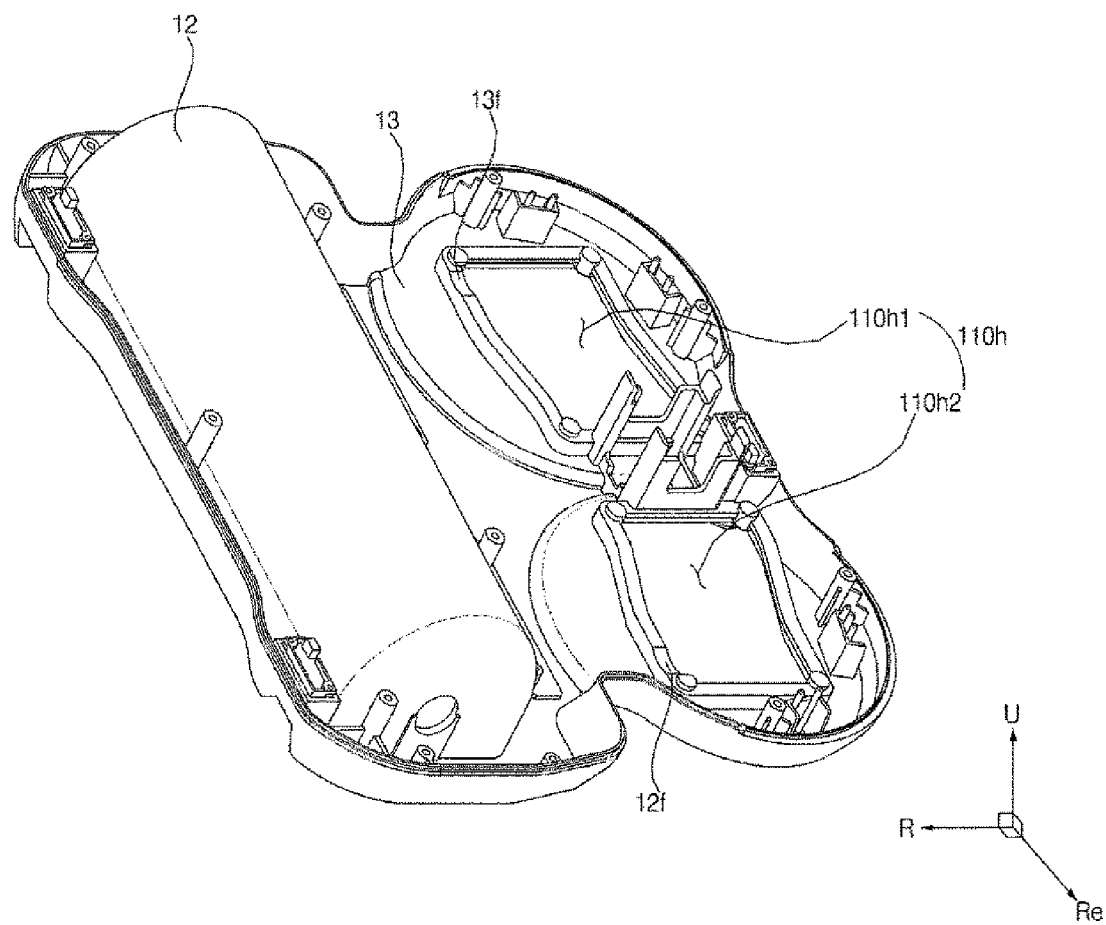
FIG. 15 is a perspective view illustrating a base 13 and a rolling-mop housing 12 of FIG. 12A.
Figure 16A:
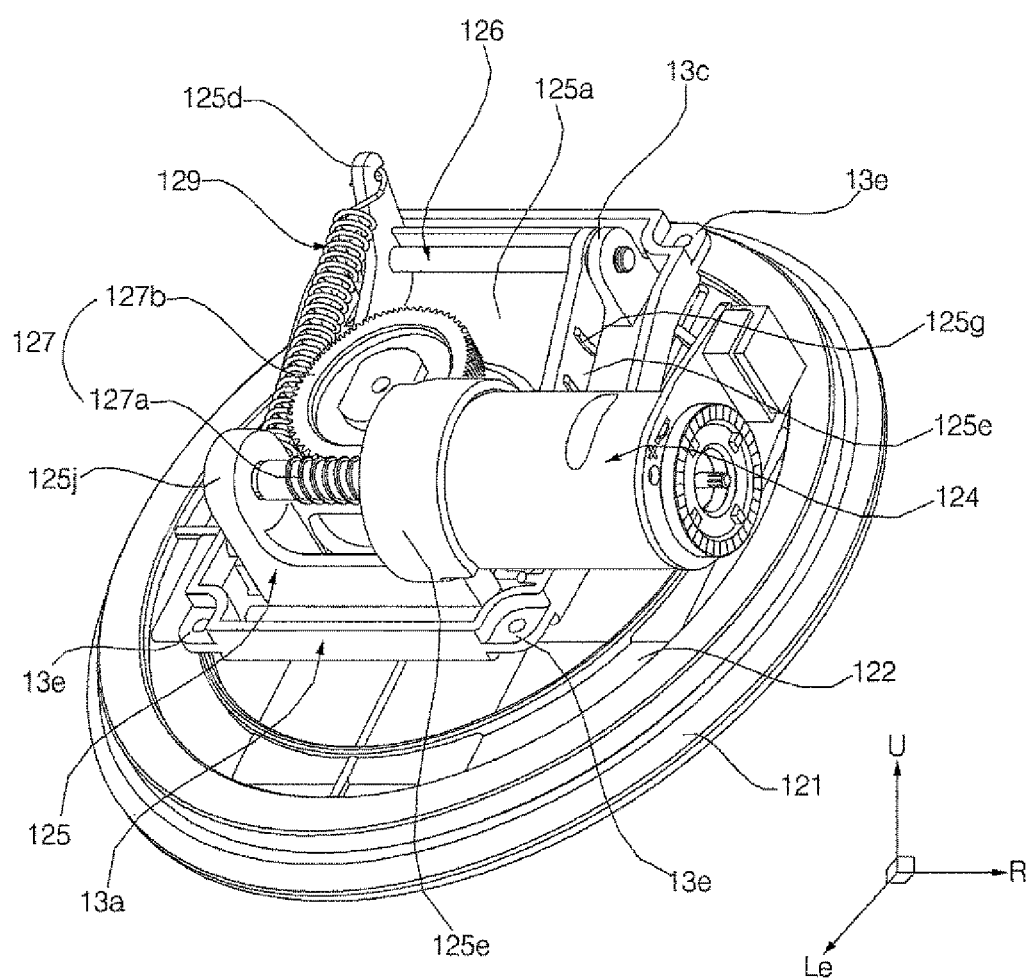
FIGS. 16A and 16B are perspective views illustrating a left spin-mop module 120-1 of a spin-mop cleaning module 120 of FIG. 12A.
Figure 16B:
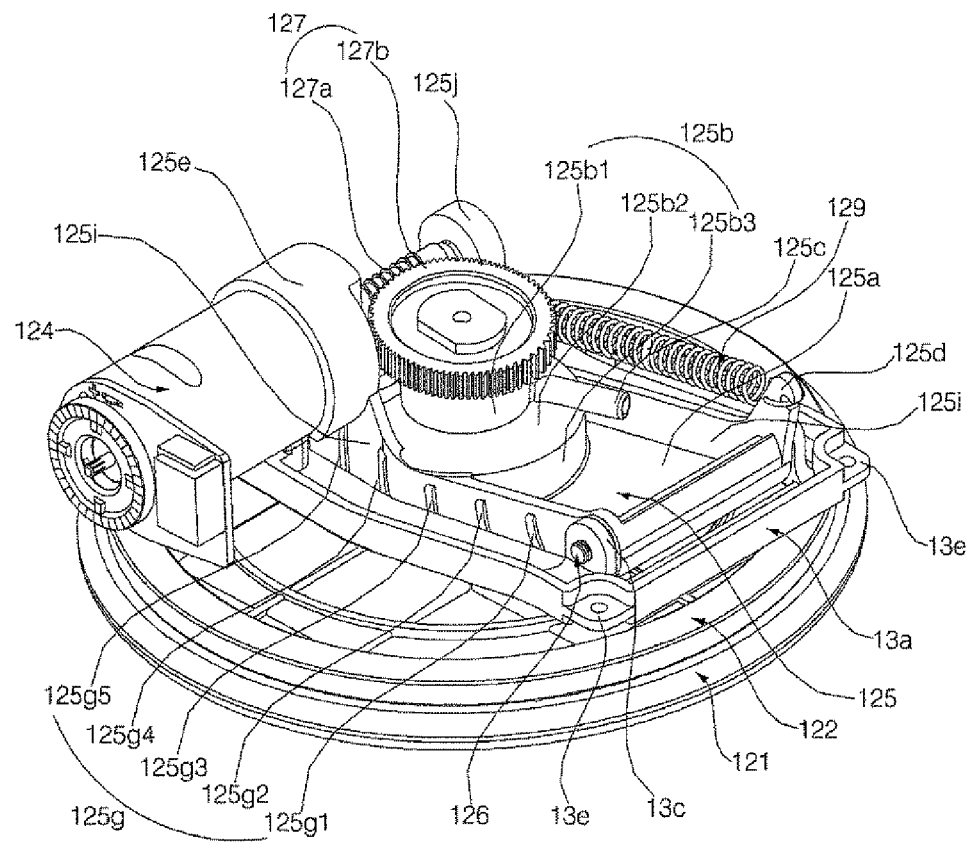
Figure 17:
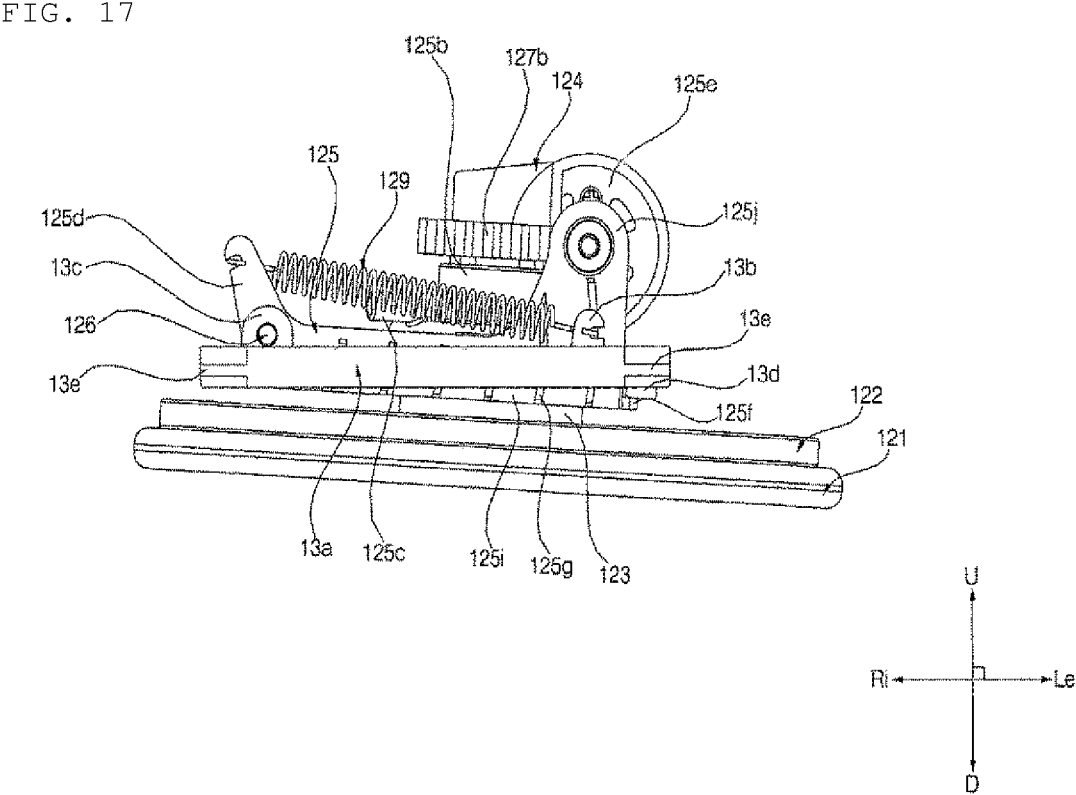
FIG. 17 is a front elevational view of the spin-mop module 120 of FIG. 16A.
Figure 18:
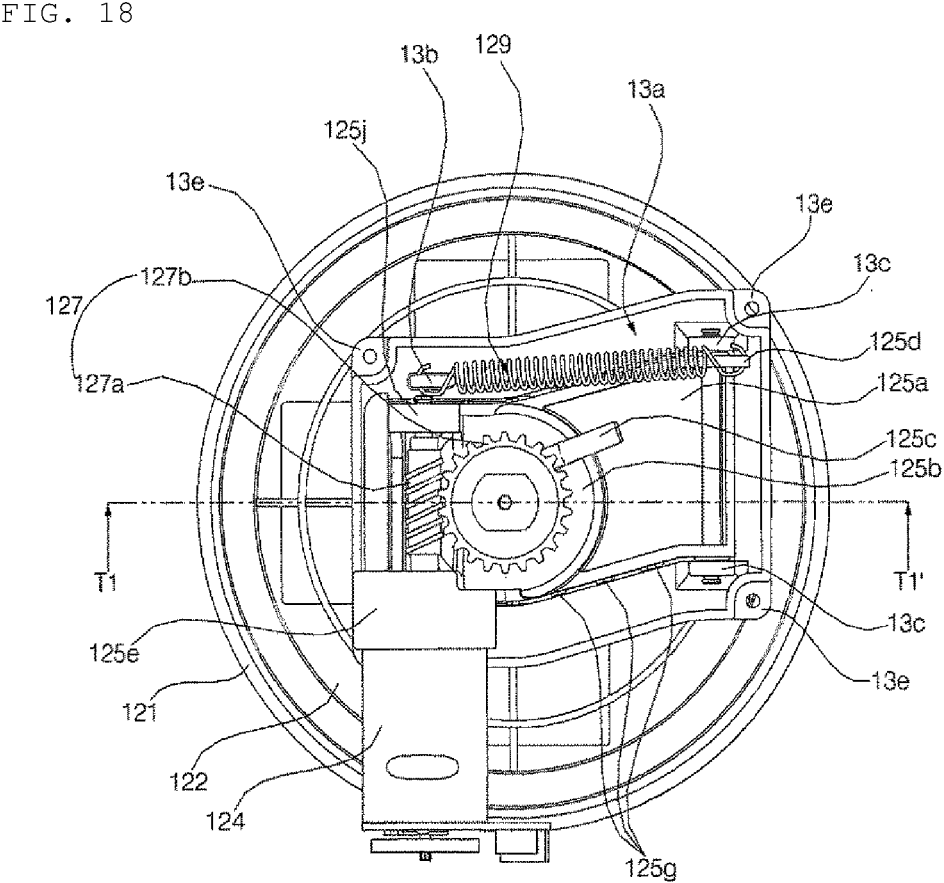
FIG. 18 is a top view of the spin-mop module 120 of FIG. 16A.
Figure 19:
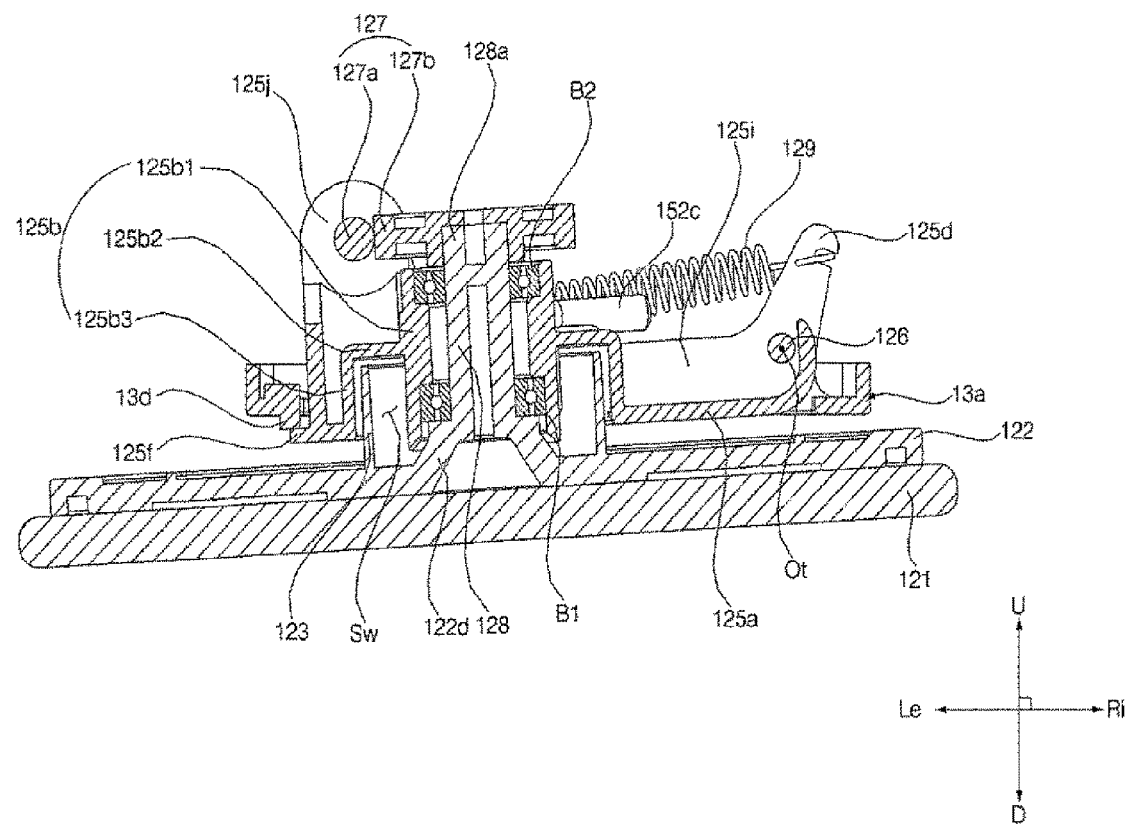
FIG. 19 is a cross-sectional view of the spin-mop module 120 of FIG. 16A taken along line T1-T1'.
Figure 20A:
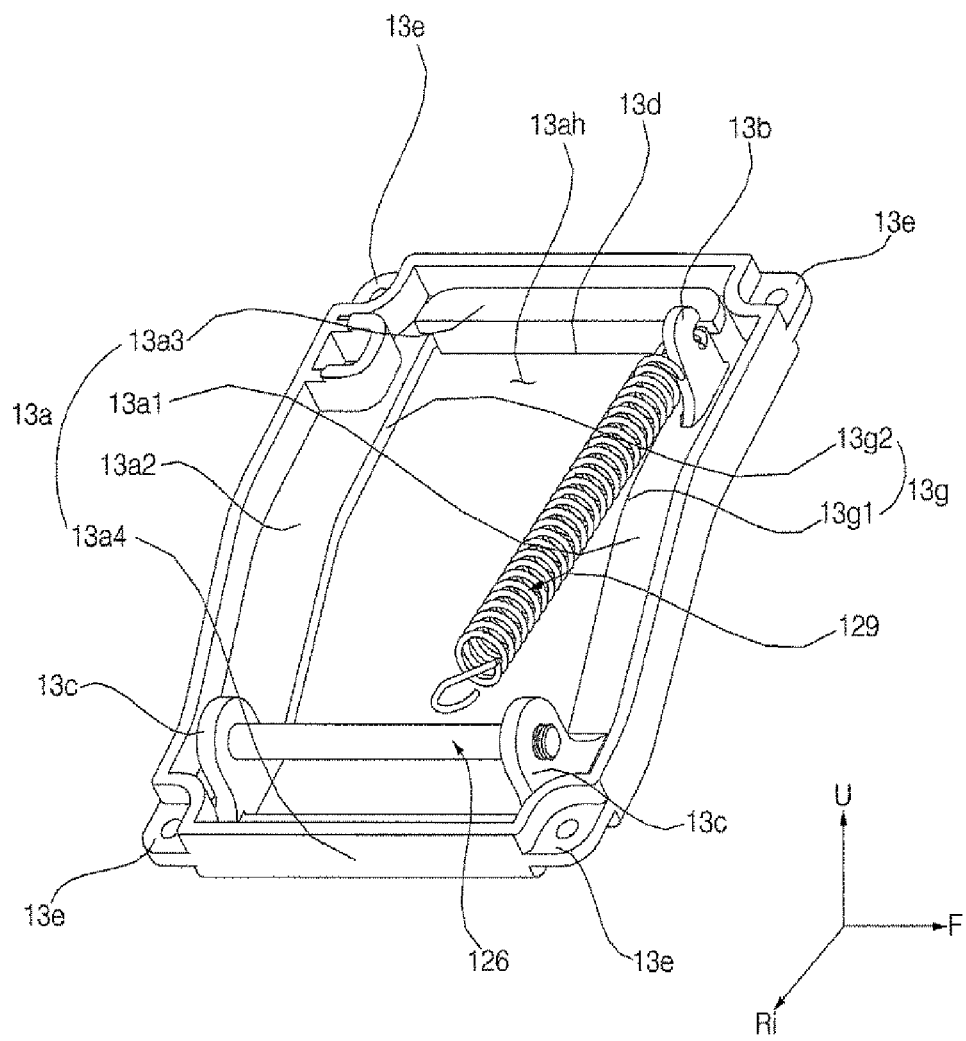
FIGS. 20A and 20B are perspective views illustrating an assembly of a support member 13a, a tilting shaft 126, and an elastic member 129 of FIG. 16A.
Figure 20B:
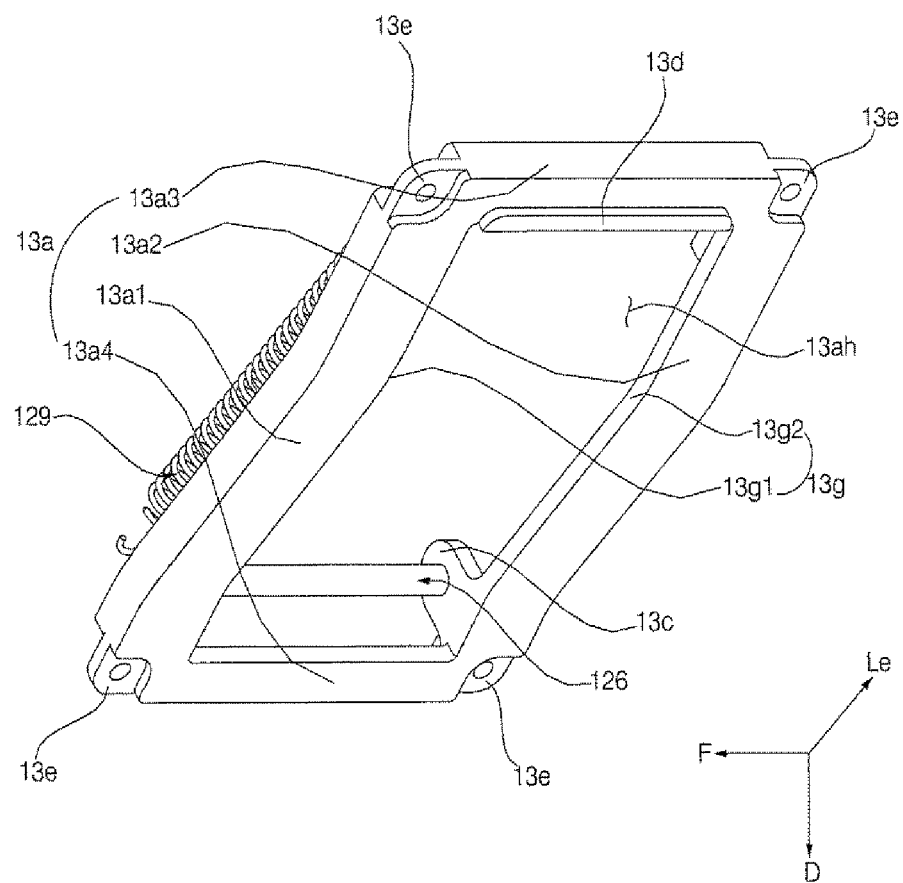
Figure 21:
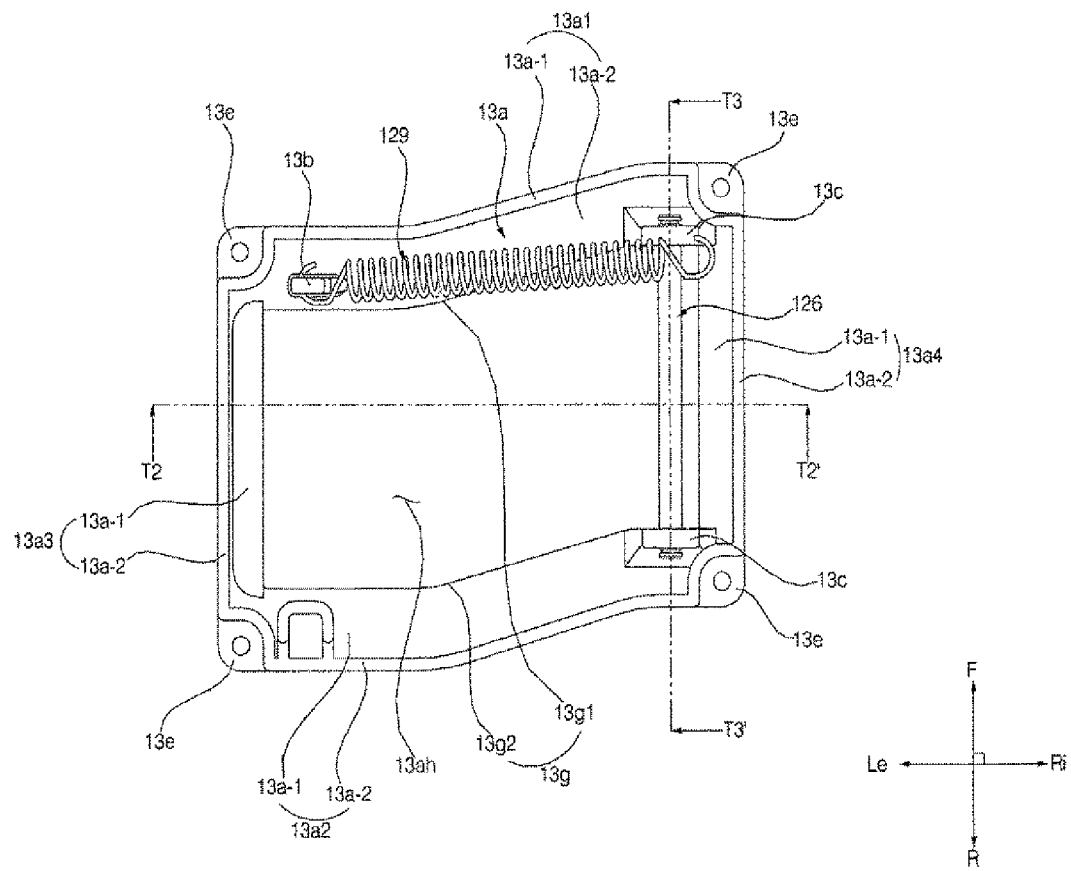
FIG. 21 is a top view of the assembly of FIG. 20A.
Figure 22:
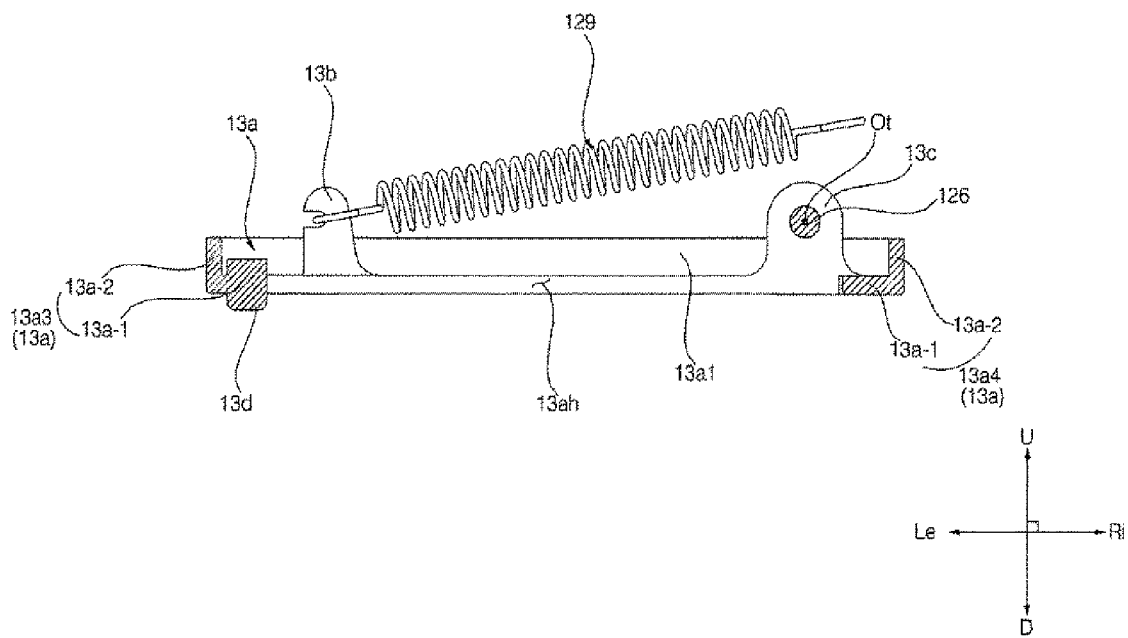
Figure 23:
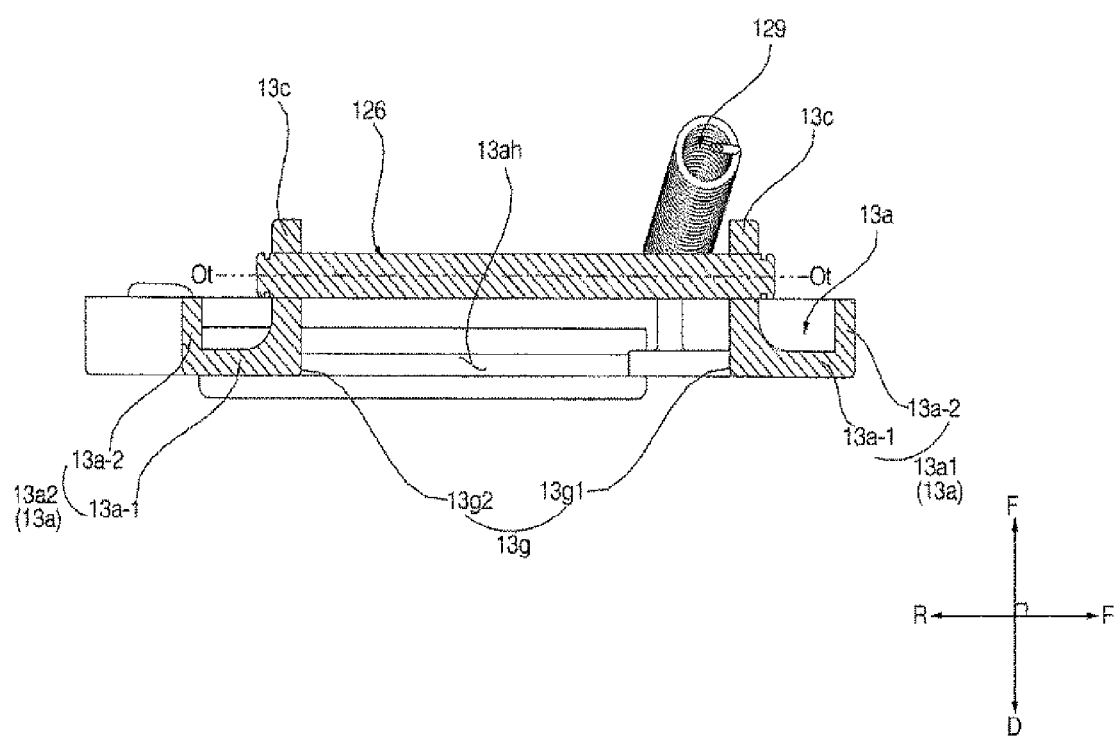
Figure 24:
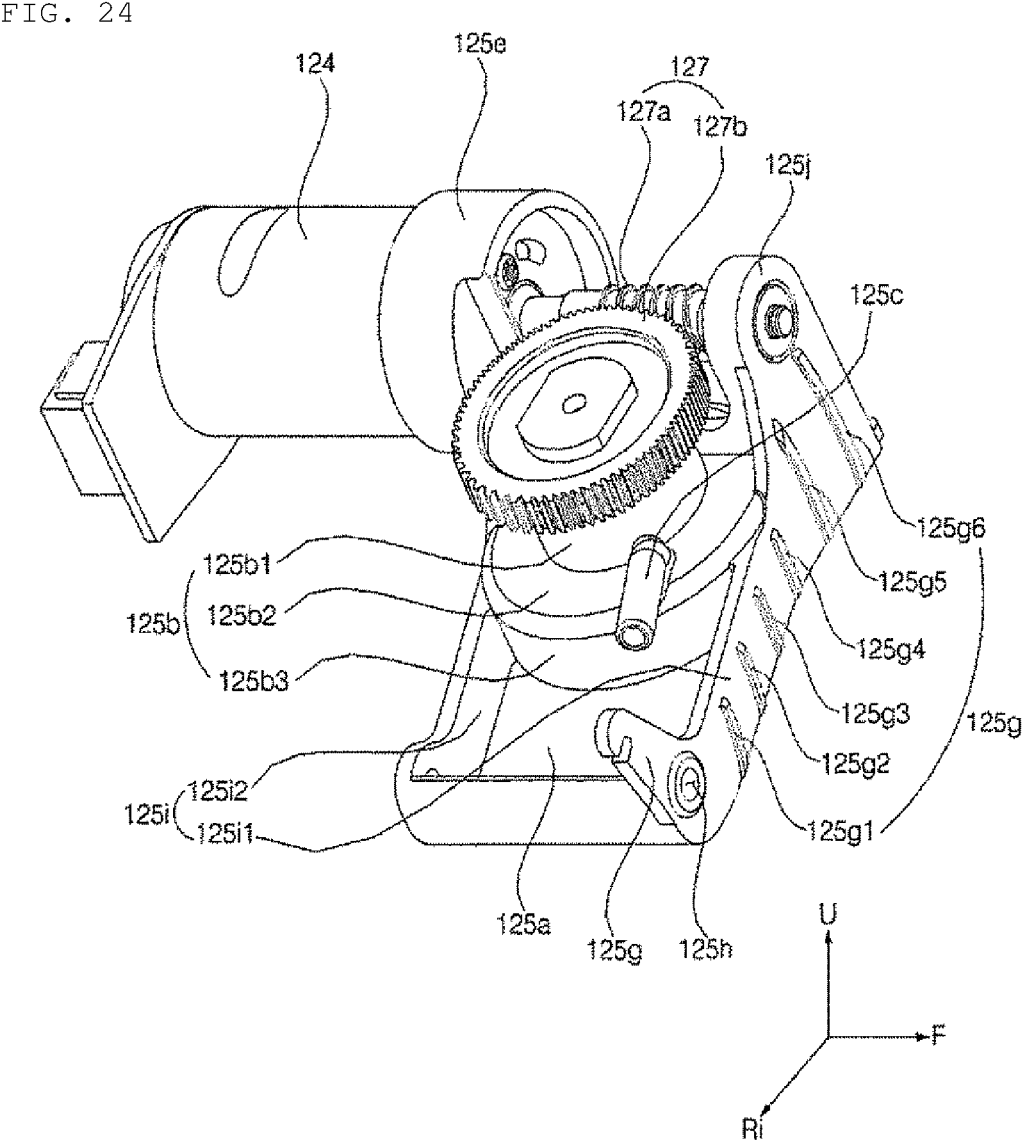
FIG. 24 is a perspective view illustrating an assembly of a tilting frame 125, a spin-drive unit 124, and a driving transmission unit 127 of FIG. 16A.
Figure 25:
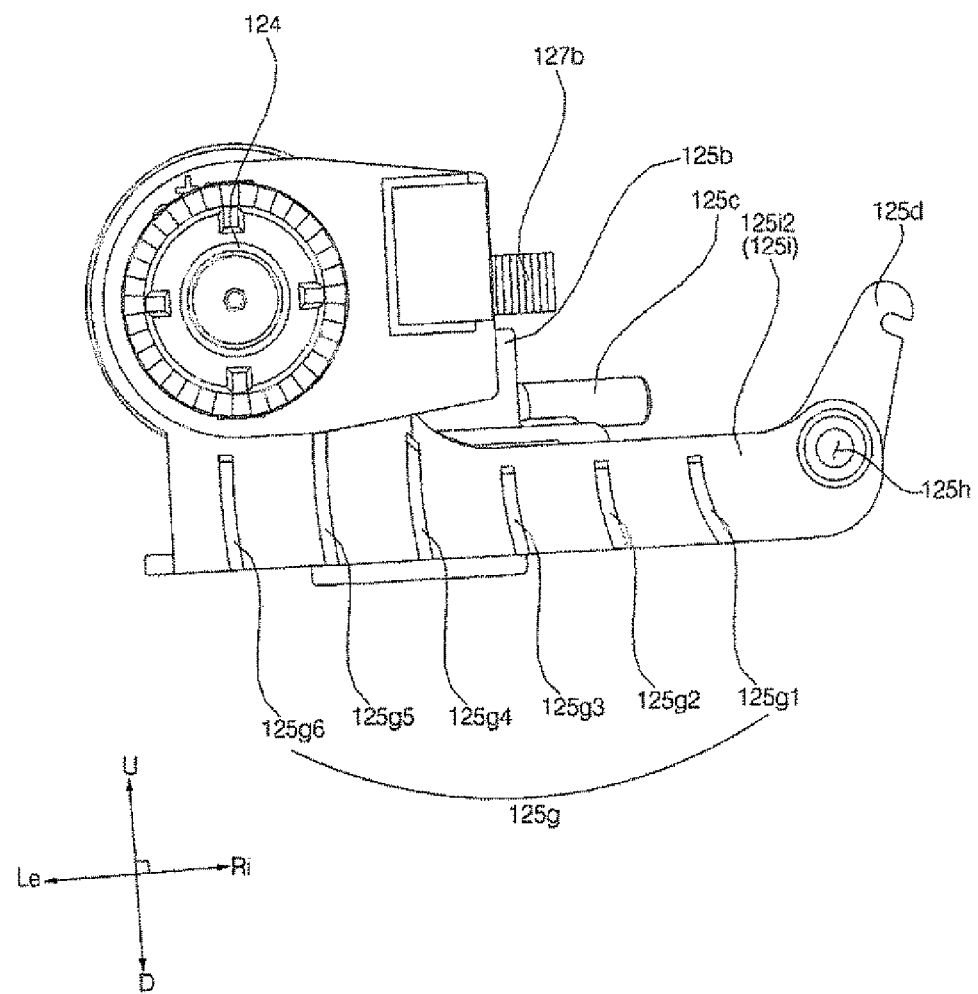
FIG. 25 is a rear elevational view of the assembly of FIG. 24.
Figure 26:
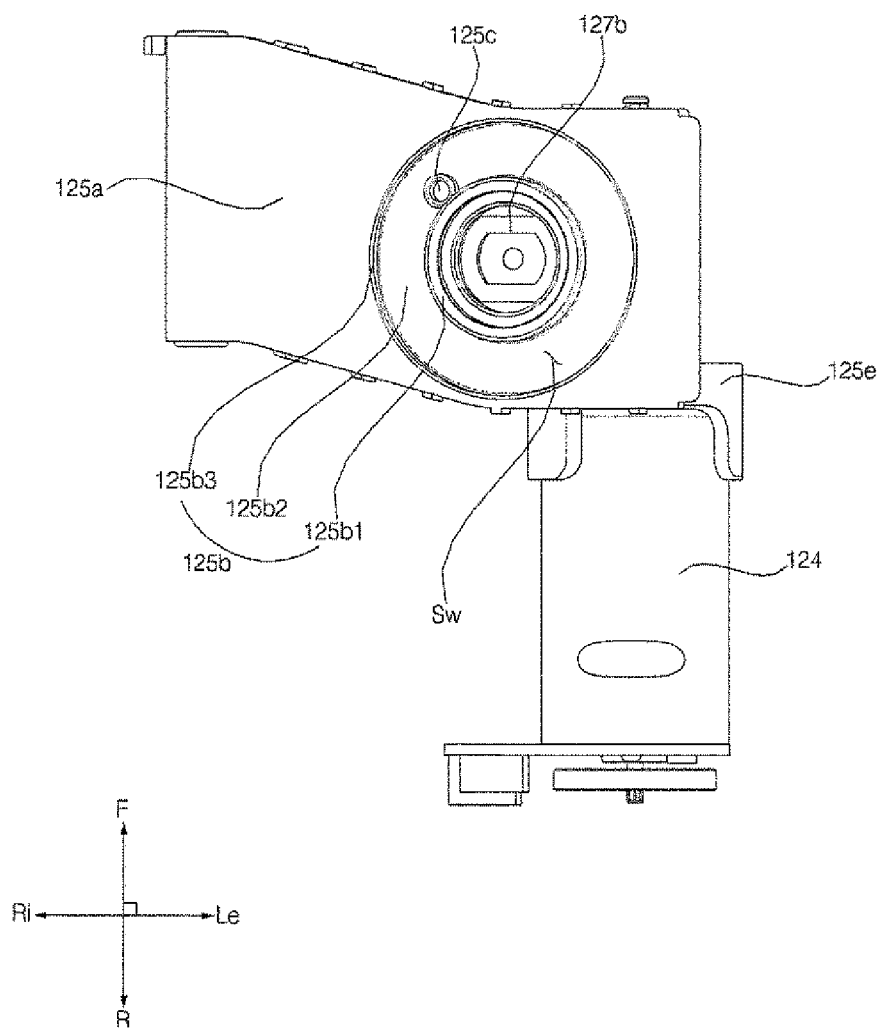
FIG. 26 is a bottom view of the assembly of FIG. 24.
Figure 27:
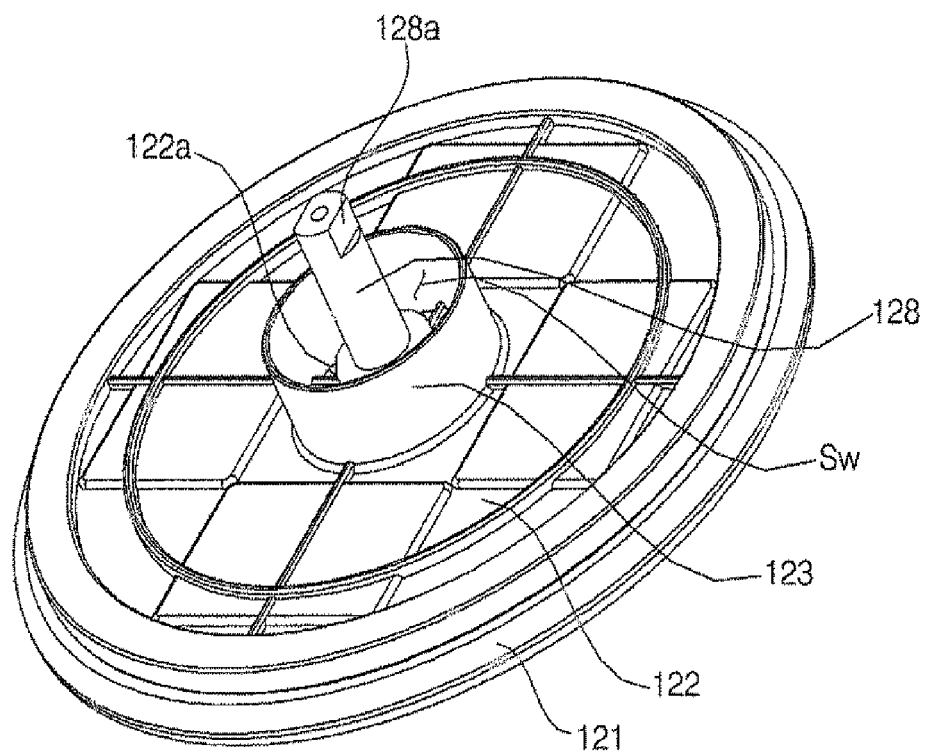
FIG. 27 is a perspective view illustrating one of a pair of spin mops 120a and 120b of the spin-mop cleaning module 120 of FIG. 12A.
Figure 28:
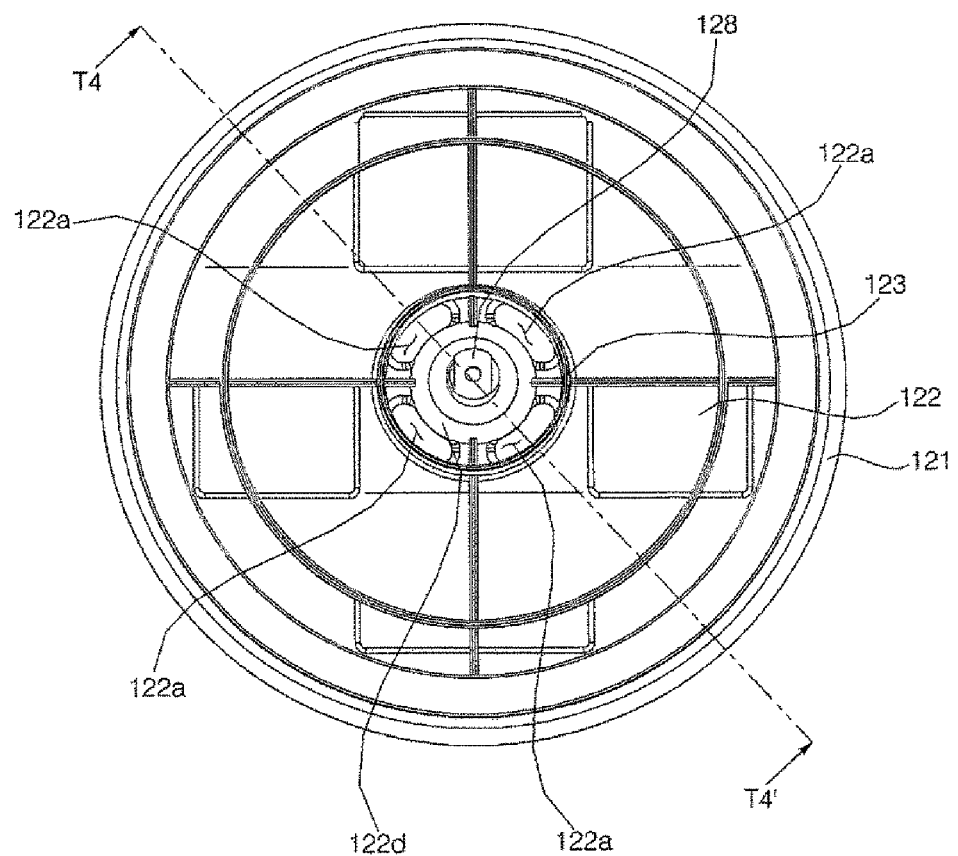
FIG. 28 is a top view of the spin mop of FIG. 27.

Referring to FIG. 15, the body 110 has a placement hole 110h formed in the lower surface thereof. The placement hole 110h is formed in the lower surface of the base 13. The placement hole 110h includes a left placement hole 110h1 and a right placement hole 110h2, which are bilaterally spaced apart from each other.

The tilting frame 125 is disposed in the placement hole 110h. The left tilting frame 125 is disposed in the left placement hole 110h1, and the right tilting frame 125 is disposed in the right placement hole 110h2. The tilting frame 125 is connected to the base 13 via the tilting shaft 126. The tilting shaft 126 is rotatably fixed to the base 13.

Referring to FIG. 15 and FIGS. 20A to 23, the body 110 includes the support member 13a. In the present embodiment, the base 13 includes the separate support member 13a, which supports the tilting frame 125. In the present embodiment, the support member 13a is provided as a separate component from the other portion of the base 13 and is fixedly coupled to the base 13, but may be integrally formed with the base 13 in another embodiment.

Referring to FIGS. 20A to 23, the support member 13a extends along the edge of the placement hole 110h. The support member 13a is centrally provided with a hole 13ah in which the tilting frame 125 is disposed. Through the provision of the separate support member 13a, pre-setting of the upper-end limit 13d of the spin-mop cleaning module 120 and assembly such as fixing of opposite ends of the elastic member 129 may be easily performed, and the repair of the spin-mop cleaning module 120 may be facilitated.

The support member 13a supports the spin-mop cleaning module 120. The support member 13a supports the tilting shaft 126, and the tilting shaft 126 supports the tilting frame 125. The tilting frame 125 supports the spin-drive unit 124, the driving transmission unit 127, and the spin shaft 128.

The support member 13a includes a first part 13a1, which is disposed on the front side to extend in the transverse direction. The support member 13a includes a second part 13a2, which is disposed on the rear side to extend in the transverse direction. The support member 13a includes a third part 13a3, which is disposed relatively close to the tilting shaft 126 to extend in the longitudinal direction. The support member 13a includes a fourth part 13a4, which is disposed relatively distant from the tilting shaft 126 to extend in the longitudinal direction. Opposite ends of the first part 13a1 are respectively connected to one end of the third part 13a3 and one end of the fourth part 13a4. Opposite ends of the second part 13a2 are respectively connected to the other end of the third part 13a3 and the other end of the fourth part 13a4.

The support member 13a includes a lower surface portion 13a-1, which extends horizontally and forms the vertical thickness. The hole 13ah is formed in the center of the lower surface portion 13a-1. The lower surface portion 13a-1 is disposed so as to face the lower side.

The support member 13a includes a rib portion 13a-2, which protrudes perpendicular to the lower surface portion 13a-1 and extends along the edge of the support member 13a. The rib portion 13a-2 protrudes upward from the lower surface portion 13a-1. The rib portion 13a-2 forms the horizontal thickness.

Each of the first to fourth parts 13a1, 13a2, 13a3 and 13a4 includes the lower surface portion 13a-1 and the rib portion 13a-2.

The support member 13a may include a second support portion 13b. The support member 13a may include a tilting-shaft support portion 13c. The support member 13a may include the upper-end limit 13d. The support member 13a may include a guide portion 13g.

The support member 13a includes a support-member fixing portion 13e, which is coupled to the edge portion of the placement hole 110h. A plurality of support-member fixing portions 13e may be disposed on the respective corner portions of the support member 13a. The support-member fixing portion 13e and the edge portion of the placement hole 110h may be coupled to each other by a fastening member such as a screw.

The base 13 includes a limit, which limits the rotational range of the tilting frame 125. The limit may include the upper-end limit 13d and a lower-end limit 13f.

The base 13 includes the upper-end limit 13d, which limits the upward rotational range of the tilting frame 125. The upper-end limit 13d is disposed on the support member 13a of the base 13. The upper-end limit 13d forms the lower surface. The lower surface of the upper-end limit 13d is provided so as to be brought into contact with the upper surface of an upper-end-limit contact portion 125f. The upper-end limit 13d is disposed on the lower surface of the base 13.

A pair of upper-end limits 13d may be disposed respectively on opposite ends of the pair of placement holes 110h1 and 110h2 in the transverse direction. The left upper-end limit 13d may be disposed on the left side of the left tilting frame 125. The right upper-end limit 13d may be disposed on the right side of the right tilting frame 125. The left upper-end limit 13d is disposed so as to be brought into contact with the upper-end-limit contact portion 125f of the left spin-mop module 120-1. The right upper-end limit 13d is disposed so as to be brought into contact with the upper-end-limit contact portion 125f of the right spin-mop module 120-2. The upper-end-limit contact portion 125f may be disposed on the tilting frame 125. In the state in which no upward push force is applied to the lower surface of the spin mop 120a or 120b, the upper-end-limit contact portion 125f is spaced apart from the upper-end limit 13d. In the state in which the cleaner 100 is normally disposed on the external horizontal plane, the upper-end-limit contact portion 125f is in contact with the upper-end limit 13d, and the inclination angle Ag1 or Ag2 reaches the minimum value Agmin.

The base 13 includes the lower-end limit 13f, which limits the downward rotational range of the tilting frame 125. The lower-end limit 13f forms the upper surface. The upper surface of the lower-end limit 13f is provided so as to be brought into contact with the lower surface of a lower-end-limit contact portion 120f. The lower-end limit 13f is disposed on the upper surface of the base 13. The lower-end limit 13f may be disposed inside the body 110. The lower-end limit 13f is disposed on the edge portion of the placement hole 110h. The lower-end limit 13f is disposed on the edge portion of the placement hole 110h, which extends in the transverse direction. The lower-end limit 13f is disposed on the front edge portion or the rear edge portion of the placement hole 110h.

The lower-end limit 13f may be disposed on the inner surface of the base 13. The lower-end limit 13f may be disposed at the lower side of the spin-drive unit 124. The lower-end limit 13f is provided so as to be brought into contact with the lower-end-limit contact portion 120f in the state in which the tilting frame 125 is rotated downward to the maximum extent. The lower-end-limit contact portion 120f may be disposed on the lower surface of the spin-drive unit 124. In the state in which the cleaner 100 is normally disposed on the external horizontal plane, the lower-end-limit contact portion 120f is spaced apart from the lower-end limit 13f. In the state in which no upward push force is applied to the lower surface of the spin mop 120a or 120b, the tilting frame 125 is rotated to the maximum angle, the lower-end-limit contact portion 120f is brought into contact with the lower-end limit 13f, and the inclination angle Ag1 or Ag2 reaches the maximum value Agmax.

The base 13 includes the second support portion 13b, which fixes the end of the elastic member 129. The second support portion 13b is disposed on the support member 13a of the base 13. A first support portion 125d supports one end of the elastic member 129, and the second support portion 13b supports the other end of the elastic member 129. When the tilting frame 125 is rotated, the elastic member 129 is elastically deformed or elastically restored by the first support portion 125d, which is fixed to the tilting frame 125, and the second support portion 13b, which is fixed to the base 13.

The second support portion 13b of the left elastic member 129 is disposed in the right area of the left spin-mop module 120-1. The second support portion 13*b* of the right elastic member 129 is disposed in the left area of the right spin-mop module 120-2.

The base 13 includes the tilting-shaft support portion 13*c*, which supports the tilting shaft 126. The tilting-shaft support portion 13*c* is disposed on the support member 13*a* of the base 13. The tilting-shaft support portion 13*c* supports opposite ends of the tilting shaft 126.

The base 13 includes the guide portion 13*g* disposed slidably with a protruding distal end of a distance holder 125*g*. The guide portion 13*g* is disposed on the support member 13*a* of the base 13. The guide portion 13*g* is disposed on the portion that defines the side end of the hole 13*ah*. The guide portion 13*g* is disposed on the side end, which extends in the direction crossing the tilting shaft 126, among the side ends of the hole 13*ah*. The guide portion 13*g* is formed so as to extend in the direction crossing the tilting shaft 126.

The guide portion 13*g* includes a first guide portion 13*g*1 disposed on the portion that defines the front end of the hole 13*ah*. The guide portion 13*g* includes a second guide portion 13*g*2 disposed on the portion that defines the rear end of the hole 13*ah*. The pair of guide portions 13*g*1 and 13*g*2 function to limit movement of the tilting frame 125 in the direction perpendicular to the rotatable track of the tilting frame 125. The pair of guide portions 13*g*1 and 13*g*2 limit the longitudinal movement of the tilting frame 125 and guides vertical rotation of the tilting frame 125.

Referring to FIGS. 16A to 19 and FIGS. 27 to 30, the spin-mop cleaning module 120 includes the rotating plate 122, to which the mop unit 121 is fixed. The rotating plate 122 is provided at the lower side of the body 110. The rotating plate 122 is rotatably provided. The rotating plate 122 may be formed by a circular plate member. The mop unit 121 is fixed to the lower surface of the rotating plate 122. The spin shaft 128 is fixed to the center portion of the rotating plate 122.

The spin-mop cleaning module 120 includes the left rotating plate 122, which fixes the mop unit 121 of the left spin mop 120*a*, and the right rotating plate 122, which fixes the mop unit 121 of the right spin mop 120*b*.

The rotating plate 122 includes a mop fixing piece 122*c*, which fixes the mop unit 121. The mop unit 121 may be separably fixed to the mop fixing piece 122*c*. The mop fixing piece 122*c* may be a Velcro tape or the like disposed at the lower side of the rotating plate 122. The mop fixing piece 122*c* may be a hook or the like disposed on the edge of the rotating plate 122.

The rotating plate 122 includes a slope 122*d*, which is disposed on the lower end of the spin shaft 128 so that the water inside a water supply space Sw moves downward along the slope 122*d* by the weigh thereof. The slope 122*d* is formed along the periphery of the lower end of the spin shaft 128. The slope 122*d* is downwardly inclined in the centrifugal direction XO. The entire slope 122*d* may be formed in a truncated cone shape. The lower end of the spin shaft 128 is fixed to the upper center of the slope 122*d*.

A water supply hole 122*a* vertically penetrates the rotating plate 122. The water supply hole 122*a* connects the water supply space Sw to the lower side of the rotating plate 122. The water inside the water supply space Sw moves to the lower side of the rotating plate 122 through the water supply hole 122*a*. The water inside the water supply space Sw moves to the mop unit 121 through the water supply hole 122*a*. The water supply hole 122*a* is located in the center portion of the rotating plate 122. The water supply hole 122*a* is located so as to avoid the spin shaft 128.

The rotating plate 122 may be provided with a plurality of water supply holes 122*a*. A connecting portion 122*b* is disposed between the respective water supply holes 122*a*. The connecting portion 122*b* interconnects the portion of the rotating plate 122 in the centrifugal direction XO and the portion of the rotating plate 122 in the counter-centrifugal direction XI on the basis of the water supply hole 122*a*.

The plurality of water supply holes 122*a* may be spaced apart from each other in the peripheral direction of the spin shaft 128. The water supply holes 122*a* may be spaced apart from each other by a constant distance. The water supply holes 122*a* are disposed in the centrifugal direction XO in the lower end portion of the slope 122*d*. The side surface of the water supply hole 122*a* in the counter-centrifugal direction XI may be aligned with the lower end portion of the slope 122*d*. The side surface Qh of the water supply hole 122*a* in the centrifugal direction XO and the side surface Qw of the water supply reservoir 123 in the counter-centrifugal direction XI are provided so as to vertically extend. The side surface Qh of the water supply hole 122*a* in the centrifugal direction XO and the side surface Qw of the water supply reservoir 123 in the counter-centrifugal direction XI are disposed on substantially the same vertical line.

The side surface Qh of the water supply hole 122*a* in the centrifugal direction XO forms a cylindrically curved surface. The side surface Qw of the water supply reservoir 123 in the counter-centrifugal direction XI forms a cylindrically curved surface. Both the side surface Qh of the water supply hole 122*a* in the centrifugal direction XO and the side surface Qw of the water supply reservoir 123 in the counter-centrifugal direction XI form a cylindrically curved surface.

The spin-mop cleaning module 120 includes the mop unit 121, which is configured so as to be brought into contact with the floor. The mop unit 121 is coupled to the lower side of the rotating plate 122. The mop unit 121 is disposed on each of the lower surface of the left spin mop 120*a* and the lower surface of the right spin mop 120*b*. The mop unit 121 may be fixedly disposed on the rotating plate 122, or may be disposed in a manner such that it is replaceable. The mop unit 121 may be separably fixed to the rotating plate 122 via a Velcro tape, a hook, or the like. The mop unit 121 may be configured by only a mop, or may include a mop and a spacer (not illustrated). The mop serves to perform mopping in contact with the floor. The spacer may be disposed between the rotating plate 122 and the mop and may serve to adjust the position of the mop. The spacer may be separably fixed to the rotating plate 122, and the mop may be separably fixed to the spacer. Needless to say, the mop 121*a* may be separably fixed to the rotating plate 122 without the spacer.

Referring to FIGS. 8 and 10 and FIGS. 14 to 30, the spin-mop cleaning module 120 includes the spin shaft 128 configured to rotate the rotating plate 122. The spin shaft 128 is fixed to the rotating plate 122 and transmits the torque of the spin-drive unit 124 to the rotating plate 122. The spin shaft 128 is connected to the upper side of the rotating plate 122. The spin shaft 128 is disposed on the upper center of the rotating plate 122. The spin shaft 128 is fixed to the rotation center Osa or Osb of the rotating plate 122. The spin shaft 128 includes a gear fixing portion 128*a* for fixing a gear 127*b*. The gear fixing portion 128*a* is disposed on the upper end of the spin shaft 128.

The spin-mop cleaning module 120 includes a left spin shaft 128 fixed to the left rotating plate 122 to rotate the left rotating plate 122, and a right spin shaft 128 fixed to the right rotating plate 122 to rotate the right rotating plate 122.

The spin shaft 128 extends perpendicular to the rotating plate 122. The left spin shaft 128 is disposed perpendicular to the lower surface of the left spin mop 120*a*, and the right spin shaft 128 is disposed perpendicular to the lower surface of the right spin mop 120*b*. In an embodiment in which the lower surface of the spin mop 120*a* or 120*b* is inclined relative to the horizontal plane, the spin shaft 128 is tilted relative to the vertical axis. The upper end of the spin shaft 128 is tilted to one side relative to the lower end. The upper end of the left spin shaft 128 is tilted leftward relative to the lower end. The upper end of the right spin shaft 128 is tilted rightward relative to the lower end.

The tilting angle of the spin shaft 128 relative to the vertical axis may be changed depending on the rotation of the tilting frame 125 about the tilting shaft 126. The spin shaft 128 is rotatably coupled to the tilting frame 125 so as to be integrally tilted with the tilting frame 125. When the tilting frame 125 is tilted, the spin-drive unit 124, the driving transmission unit 127, the spin shaft 128, the rotating plate 122, the water supply reservoir 123, and the mop unit 121 are integrally tilted.

The spin-mop cleaning module 120 includes the water supply reservoir 123, which is disposed at the upper side of the rotating plate 122 so as to accommodate therein water. The water supply reservoir 123 defines the water supply space Sw in which water is accommodated. The water supply reservoir 123 surrounds the periphery of the spin shaft 128 and is spaced apart from the spin shaft 128 so as to define the water supply space Sw therebetween. The water supply reservoir 123 allows the water supplied to the upper side of the rotating plate 122 to be collected in the water supply space Sw until the water passes through the water supply hole 122*a*. The water supply space Sw is disposed at the upper side of the center portion of the rotating plate 122. The entire water supply space Sw has a cylindrical volume. The upper side of the water supply space Sw is open so that the water is introduced into the water supply space Sw through the upper side of the water supply space Sw.

The water supply reservoir 123 protrudes upward from the rotating plate 122. The water supply reservoir 123 extends in the peripheral direction of the spin shaft 128. The water supply reservoir 123 may be formed by a ring-shaped rib. The water supply hole 122*a* is located in the inner lower surface of the water supply reservoir 123. The water supply reservoir 123 is spaced apart from the spin shaft 128.

The surface Qw of the water supply reservoir 123 in the counter-centrifugal direction XI faces the outer peripheral surface of the spin shaft 128. The side surface Qw is spaced apart from the spin shaft 128. The side surface Qw is vertically smoothly connected to the side surface Qh. The lower end of the water supply reservoir 123 is fixed to the rotating plate 122. The water supply reservoir 123 has a free upper end.

Referring to FIGS. 16A to 19 and FIGS. 24 to 26, the spin-mop cleaning module 120 includes the spin-drive unit 124, which provides drive force for the rotation of the spin mop 120*a* or 120*b*. The spin-drive unit 124 is fixed to the tilting frame 125. The spin-drive unit 124 is supported by a motor support portion 125*e* of the tilting frame 125.

The spin-drive unit 124 may be supported so as to protrude horizontally. In the present embodiment, the front end portion of the spin-drive unit 124 is supported by the tilting frame 125, and the rear end portion of the spin-drive unit 124 protrudes rearward. The spin-drive unit 124 is disposed so as to cross the boundary between the tilting frame 125 and the base 13 when viewed from the upper side. The spin-drive unit 124 is disposed in the longitudinal direction so as to cross the boundary between the tilting frame 125 and the base 13 in the longitudinal direction when viewed from the upper side. The spin-drive unit 124 may include a portion that is disposed at the upper side of the lower-end limit 13*f*.

The spin-drive unit 124 is integrally moved with the tilting frame 125. When the tilting frame 125 rotates about the tilting rotational axis Ot, the spin-drive unit 124 integrally rotates with the tilting frame 125.

The spin-mop cleaning module 120 includes a left spin-drive unit 124, which provides power required for rotating the left spin shaft 128, and a right spin-drive unit 124, which provides power required for rotating the right spin shaft 128. The left spin-drive unit 124 provides drive force required for rotating the left spin shaft 128. The right spin-drive unit 124 provides drive force required for rotating the right spin shaft 128.

The spin-mop cleaning module 120 includes the driving transmission unit 127, which transmits the torque of the spin-drive unit 124 to the spin shaft 128. The driving transmission unit 127 may include a plurality of gears and/or a belt, for example.

In the present embodiment, the driving transmission unit 127 includes a first gear 127*a* fixed to a rotating shaft of the motor 124. The first gear 127*a* may be a worm gear. The driving transmission unit 127 may include a second gear 127*b*, which is engaged and rotated with the first gear 127*a*. The second gear 127*b* may be a spur gear. The second gear 127*b* is fixed to the spin shaft 128 so as to allow the spin shaft 128 to be rotated simultaneously with the rotation of the second gear 127*b*.

The spin-mop cleaning module 120 includes the tilting frame 125, which is disposed on the body 110 so as to be tiltable within a predetermined angular range. The tilting frame 125 rotatably supports the spin shaft 128.

The tilting frame 125 is rotatable relative to the body 110 within a predetermined range about the tilting rotational axis Ot. When the tilting frame 125 rotates about the tilting rotational axis Ot, the spin-drive unit 124 and the spin shaft 128 rotate about the tilting rotational axis Ot integrally with the tilting frame 125. When the tilting frame 125 rotates about the tilting rotational axis Ot, the first support portion 125*d* fixed to the tilting frame 125 rotates about the tilting rotational axis Ot, causing a change in the length of the elastic member 129.

The inclination angle Ag1 or Ag2 of the tilting frame 125 may be changed depending on the state of the floor. The tilting frame 125 may perform a suspension function for the spin mop 120*a* or 120*b* (a function of supporting the weight and alleviating vertical vibration). The tilting frame 125 is tiltably supported by the base 13. The tilting frame 125 rotatably supports the spin shaft 128.

The spin-mop cleaning module 120 includes the left tilting frame 125, which supports the left spin shaft 128. The left tilting frame 125 is rotatable within a predetermined range about a left tilting shaft 126.

The spin-mop cleaning module 120 includes the right tilting frame 125, which supports the right spin shaft 128. The right tilting frame 125 is rotatable within a predetermined range about a right tilting shaft 126.

For example, when the left spin mop 120*a* is brought into contact with a recessed portion in the floor, the inclination angle Ag1 of the left spin mop 120*a* may be increased within the maximum value Agmax by the left tilting frame 125. When the right spin mop 120*b* is brought into contact with a recessed portion in the floor, the inclination angle Ag2 of the right spin mop 120*b* may be increased within the maximum value Agmax by the right tilting frame 125.

The tilting frame 125 includes a frame base 125*a* defining the lower surface thereof. The spin shaft 128 is disposed so as to vertically penetrate the frame base 125*a*. The frame base 125*a* may be configured by a plate, which forms a vertical thickness. The tilting shaft 126 rotatably interconnects the base 13 and the frame base 125*a*.

A water supply cabinet 125*b* is included inside the tilting frame 125 so as to accommodate therein the spin shaft 128. The water supply cabinet 125*b* defines a space recessed upward from the lower side of the body 110 so as to accommodate the upper end portion of the water supply reservoir 123. The water supply cabinet 125*b* is fixed to the frame base 125*a*. The water supply cabinet 125*b* defines the space recessed upward from the lower surface of the frame base 125*a*. The water is introduced into the space defined by the water supply cabinet 125*b* through a water feeder 125*c*.

The water supply cabinet 125*b* includes a spin-shaft support portion 125*b*1, which rotatably supports the spin shaft 128. A bearing B may be provided between the spin-shaft support portion 125*b*1 and the spin shaft 128. The bearing B may include a first bearing B1 disposed at the lower side, and a second bearing B2 disposed at the upper side.

The lower end portion of the spin-shaft support portion 125*b*1 is inserted into the water supply space Sw of the water supply reservoir 123. The inner peripheral surface of the spin-shaft support portion 125*b*1 supports the spin shaft 128. The outer peripheral surface of the spin-shaft support portion 125*b*1 faces the inner peripheral surface Qw of the water supply reservoir 123.

The lower end portion of the spin-shaft support portion 125*b*1 is disposed between the spin shaft 128 and the inner peripheral surface Qw of the water supply reservoir 123. The outer peripheral surface of the lower end portion of the spin-shaft support portion 125*b*1 is spaced apart from the inner peripheral surface Qw of the water supply reservoir 123 so as to define the water supply space Sw therebetween. The slope 122*d* is disposed on the lower end portion of the spin-shaft support portion 125*b*1.

The water supply cabinet 125*b* includes partitions 125*b*2 and 125*b*3, which protrude from the spin-shaft support portion 125*b*1. The partitions 125*b*2 and 125*b*3 cover the upper end portion of the water supply reservoir 123. The partitions 125*b*2 and 125*b*3 cover the upper end and the outer peripheral surface of the water supply reservoir 123. The partitions 125*b*2 and 125*b*3 are disposed in the centrifugal direction XO of the spin-shaft support portion 125*b*1. The partitions 125*b*2 and 125*b*3 are fixed to and supported by the frame base 125*a*. The partitions 125*b*2 and 125*b*3 support the spin-shaft support portion 125*b*1.

The partitions 125*b*2 and 125*b*3 include a first partition 125*b*2, which covers the upper end of the water supply reservoir 123. The first partition 125*b*2 protrudes from the spin-shaft support portion 125*b*1 in the centrifugal direction XO. The partitions 125*b*2 and 125*b*3 include a second partition 125*b*3, which covers the upper end portion of the outer peripheral surface of the water supply reservoir 123. The second partition 125*b*3 protrudes downward from the first partition 125*b*2. The second partition 125*b*3 has a free lower end.

The tilting frame 125 includes the water feeder 125*c*, which receives water from the water supply module 150. The water feeder 125*c* receives the water from a supply pipe 156. The water feeder 125*c* forms a water flow path. The water feeder 125*c* guides the water to pass through the water supply cabinet 125*b* and be introduced into the water supply reservoir 123. One end of the flow path formed by the water feeder 125*c* is connected to the end of the water supply pipe 156. One end of the flow path formed by the water feeder 125*c* protrudes outward from the water supply cabinet 125*b* and the other end protrudes into the water supply space Sw. One end of the flow path formed by the water feeder 125*c* is disposed outside the water supply cabinet 125*b* (inside the body 110), and the other end is disposed inside the water supply cabinet 125*b* (in the portion in which the water supply space Sw is disposed). The water feeder 125*c* is fixed to the tilting frame 125. The water feeder 125*c* is fixed to the water supply cabinet 125*b*.

The tilting frame 125 includes the first support portion 125*d*, which supports one end of the elastic member 129. When the tilting frame 125 is tilted about the tilting shaft 126, the position of the first support portion 125*d* is changed and the length of the elastic member 129 is changed.

The first support portion 125*d* is disposed on the tilting frame 125. The first support portion 125*d* is disposed on the right portion of the left tilting frame 125. The first support portion 125*d* is disposed on the left portion of the right tilting frame 125.

The first support portion 125*d* is fixed to the tilting frame 125. When the tilting frame 125 is tilted, the first support portion 125*d* is also tilted with the tilting frame 125. The first support portion 125*d* protrudes away from the titling shaft 126. The first support portion 125*d* forms a distal end portion located at the upper side of the tilting shaft 126. One end of the elastic member 129 is supported by the distal end portion of the first support portion 125*d*.

The tilting frame 125 includes a vertical portion 125*i*, which protrudes upward from the edge of the frame base 125*a*. The vertical portion 125*i* protrudes upward from the portion of the edge of the frame base 125*a*, which extends away from the tilting rotational axis Ot. The vertical portion 125*i* protrudes upward from the portion of the edge of the frame base 125*a*, which extends in the transverse direction. The protruding height of the vertical portion 125*i* increases with increasing distance from the tilting rotational axis Ot.

A pair of vertical portions 125*i*1 and 125*i*2 is respectively disposed on the front end portion and the rear end portion of the frame base 125*a*. The first vertical portion 125*i*1 is disposed on the front end portion of the frame base 125*a*. The second vertical portion 125*i*2 is disposed on the rear end portion of the frame base 125*a*.

The first vertical portion 125*i*1 has a front surface facing the guide portion 13*g*. The front surface of the first vertical portion 125*i*1 faces the first guide portion 13*g*1.

The second vertical portion 125*i*2 has a rear surface facing the guide portion 13*g*. The rear surface of the second vertical portion 125*i*2 faces the second guide portion 13*g*2.

The tilting frame 125 includes the distance holder 125*g*, which protrudes from a portion of the vertical portion 125*i*. The protruding distal end of the distance holder 125*g* may be brought into contact with the guide portion 13*g*. When the tilting frame 125 rotates about the tilting rotational axis Ot, the distance holder 125*g* is slidable in contact with the guide portion 13*g*.

The entire distance holder 125*g* extends in the vertical direction. The distance holder 125*g* extends along the rotation track of the tilting frame 125. The distance holder 125*g* may extend so as to concavely bend toward the tilting rotational axis Ot. The distance holder 125*g* may have a rib shape.

The distance holder 125*g* protrudes from the vertical portion 125*i* in the extending direction of the tilting rotational axis Ot. There is provided the distance holder 125*g*, which protrudes forward from the first vertical portion 125*i*1. There is provided the distance holder 125*g*, which protrudes rearward from the second vertical portion 125*i*2. The distance holder 125*g*, which protrudes forward from the first vertical portion 125*i*1, may be brought into contact with the first guide portion 13*g*1. The distance holder 125*g*, which protrudes rearward from the second vertical portion 125*i*2, may be brought into contact with the second guide portion 13*g*2.

A plurality of distance holders 125*g* may be provided. The distance holders 125*g*1, 125*g*2, 125*g*3, 125*g*4, 125*g*5 and 125*g*6 may be arranged side by side so as to be spaced apart from each other. The distance holders 125*g*1, 125*g*2, 125*g*3, 125*g*4, 125*g*5 and 125*g*6 may be spaced apart from each other in the direction away from the tilting rotational axis Ot. In the present embodiment, six distance holders 125*g* are provided on a single vertical portion 125*i*.

The tilting frame 125 includes the motor support portion 125*e*, which supports the spin-drive unit 124. The motor support portion 125*e* supports the front end portion of the spin-drive unit 124. The motor support portion 125*e* extends from the second vertical portion 125*i*2.

The tilting frame 125 includes a gear support portion 125*j*, which supports at least a portion of the driving transmission unit 127. The gear support portion 125*j* supports one end portion of a rotating shaft of the first gear 127*a*. The gear support portion 125*j* extends from the first vertical portion 125*i*1.

The tilting frame 125 includes the upper-end-limit contact portion 125*f* configured so as to be brought into contact with the upper-end limit 13*d*. The upper surface of the upper-end-limit contact portion 125*f* may be brought into contact with the lower surface of the upper-end limit 13*d*. In the state in which the inclination angle reaches the minimum value Agmin, the upper surface of the upper-end-limit contact portion 125*f* is brought into contact with the upper-end limit 13*d*. In the state in which the inclination angle exceeds the minimum value Agmin, the upper-end-limit contact portion 125*f* is spaced apart from the upper-end limit 13*d*.

The upper-end-limit contact portion 125*f* extends from the frame base 125*a*. The upper-end-limit contact portion 125*f* protrudes from the frame base 125*a* in the direction away from the tilting rotational axis Ot.

A left upper-end-limit contact portion 125*f* may be disposed on the left end of the left tilting frame 125. A right upper-end-limit contact portion 125*f* may be disposed on the right end of the right tilting frame 125.

The tilting frame 125 is provided with a titling-shaft through-hole 125*h* for the passage of the tilting shaft 126. The tilting-shaft through-hole 125*h* is formed in the vertical portion 125*i* in the longitudinal direction. At least two tilting-shaft through-holes 125*h* are spaced apart from each other in the longitudinal direction.

Referring to FIGS. 16A to 23, the spin-mop cleaning module 120 includes the tilting shaft 126, which is a rotating shaft of the tilting frame 125. The tilting shaft 126 has the tilting rotational axis Ot. In other words, the tilting shaft 126 provides the tilting rotational axis Ot. By the tilting shaft 126, the rotation of the tilting frame 125 about the tilting rotational axis Ot may be realized.

The tilting shaft 126 is supported by the body 110. The tilting shaft 126 is supported by the base 13. The tilting shaft 126 may be supported by the support member 13*a* of the base 13. The tilting shaft 126 is supported by the tilting-shaft support portion 13*c*. Opposite ends of the tilting shaft 126 are supported by the body 110.

The tilting shaft 126 is disposed so as to penetrate the tilting frame 125. The tilting frame 125 is rotatably supported by the tilting shaft 126.

The tilting shaft 126 extends in the direction perpendicular to the inclined direction of the spin mop 120*a* or 120*b*. The tilting shaft 126 extends the horizontal direction. The tilting shaft 126 extends in the extending direction of the tilting rotational axis Ot. In the present embodiment, the tilting shaft 126 extends in the longitudinal direction.

The spin-mop cleaning module 120 includes the left tilting shaft 126, which extends in the direction perpendicular to the inclined direction of the lower surface of the left spin mop 120*a*. The spin-mop cleaning module 120 includes the right tilting shaft 126, which extends in the direction perpendicular to the inclined direction of the lower surface of the right spin mop 120*b*. The left tilting shaft 126 and the right tilting shaft 126 may be bilaterally symmetrically disposed to each other.

The spin-mop cleaning module 120 includes at least one elastic member 129, which applies elastic force to the tilting frame 125. The elastic member 129 applies the elastic force so that the inclination angle of the tilting frame 125 is increased. The elastic member 129 enables shock-absorbing (elastic) operation of the tilting frame 125.

The elastic member 129 stretches when the tilting frame 125 is rotated downward, and shrinks when the tilting frame 125 is rotated upward. The elastic member 129 applies a moment to the tilting frame 125 so that the inclination angle Ag1 or Ag2 is increased. The elastic member 129 further stretches and is further elastically deformed as the inclination angle is reduced.

The elastic member 129 includes a left elastic member 129, which applies elastic force so that the inclination angle Ag1 of the lower surface of the left spin mop 120*a* is increased, and a right elastic member 129, which applies elastic force so that the inclination angle Ag2 of the lower surface of the right spin mop 120*b* is increased.

The elastic member 129 includes the left elastic member 129, which applies elastic force so that the inclination angle of the lower surface of the left spin mop 120*a* in the leftward and downward direction is increased, and the right elastic member 129, which applies elastic force so that the inclination angle of the lower surface of the right spin mop 120*b* in the rightward and downward direction is increased.

The elastic member 129 may be disposed such that the entirety thereof extends a long length in the transverse direction. The elastic member 129 undergoes elastic tension stress in the transverse direction.

The elastic member 129 may be disposed so as to be inclined. In the present embodiment, the left elastic member 129 extends a long length in the leftward and downward direction when viewed from the rear side. In addition, the right elastic member 129 extends a long length in the rightward and downward direction when viewed from the rear side.

The elastic member 129 may be disposed on the front portion of the tilting frame 125. The elastic member 129 may be disposed on the front portion of the support member 13*a*.

Figure 12A:
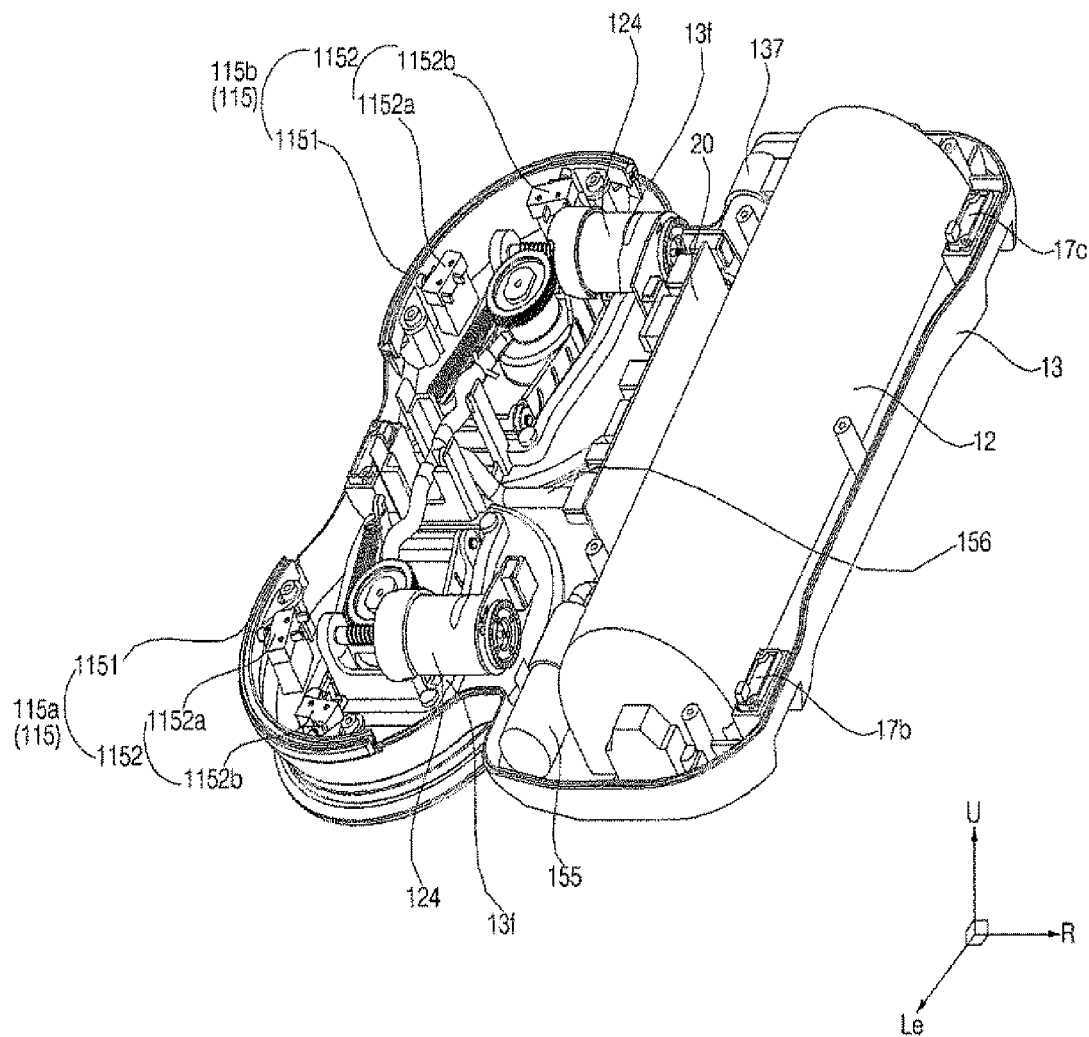
FIGS. 12A and 12B are perspective views illustrating the state in which a case 11 and a battery 160 are removed from the cleaner 100 of FIG. 1.
Figure 12B:
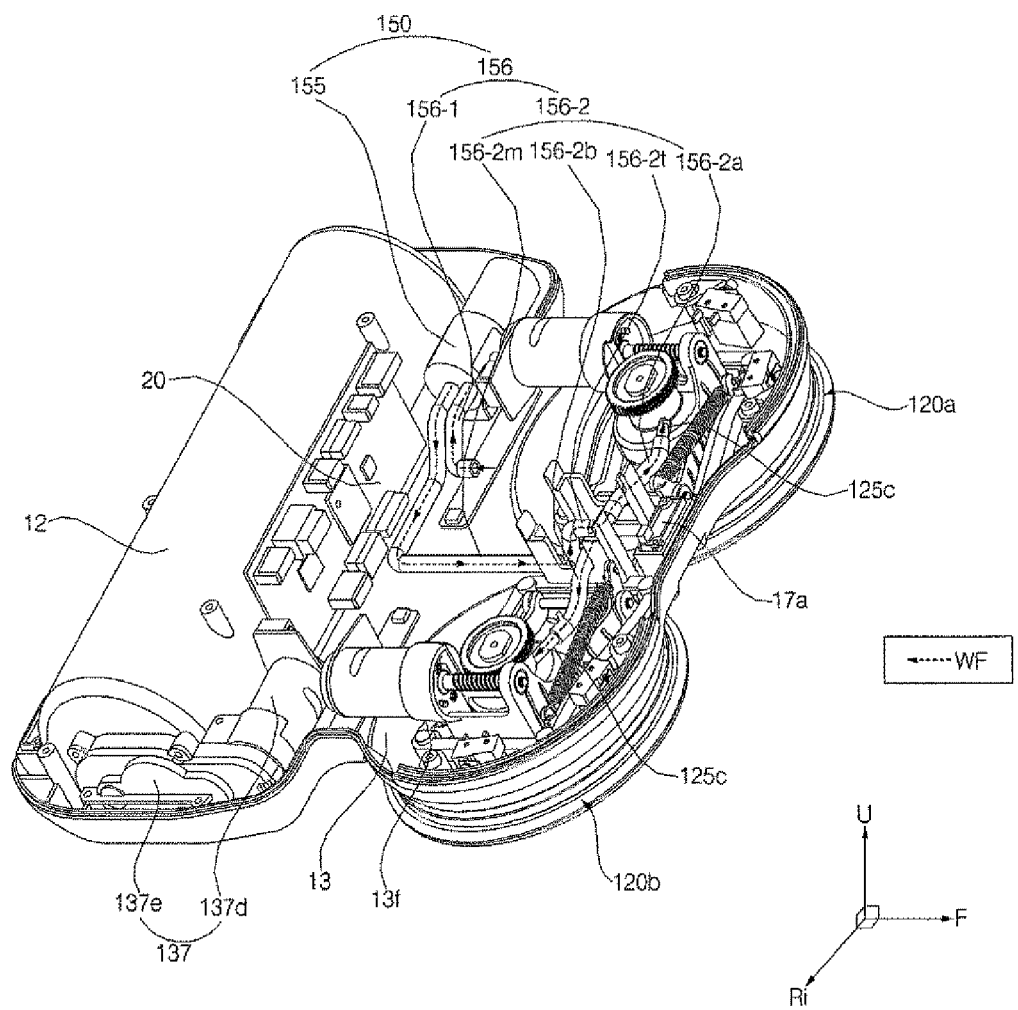

Referring to FIGS. 12A, 12B and 33, the spin-mop cleaning module 120 includes the lower-end-limit contact portion 120*f* configured to be brought into contact with the lower-end limit 13*f*. The lower surface of the lower-end-limit contact portion 120*f* may be brought into contact with the upper surface of the lower-end limit 13*f*. In the state in which the inclination angle reaches the maximum value Agmax, the lower surface of the lower-end-limit contact portion 120*f* is brought into contact with the lower-end limit 13f. In the state in which the inclination angle is below the maximum value Agmax, the lower-end-limit contact portion 120f is spaced apart from the lower-end limit 13f.

The lower-end-limit contact portion 120f may be disposed on the lower portion of the spin-drive unit 124. The spin-drive unit 124 may be disposed so as to protrude horizontally from the tilting frame 125. The lower-end-limit contact portion 120f is disposed on the lower portion of the protruding portion of the spin-drive unit 124.

Referring to FIGS. 31 to 33, in the state in which the inclination angle Ag1 or Ag2 is the minimum value Agmin, the distance between the first support portion 125d and the second support portion 13b is the greatest, and the elastic member 129 elastically stretches. In the state in which the inclination angle Ag1 or Ag2 is the maximum value Agmax, the distance between the first support portion 125d and the second support portion 13b is the shortest, and the elastic member 129 elastically shrinks via elastic restoration. The elastic member 129 is provided so as to undergo elastic tension stress as the inclination angle Ag1 or Ag2 is reduced.

When the left tilting frame 125 rotates in the counterclockwise direction about the tilting shaft 126 when viewed from the rear side, the distal end portion of the second support portion 13b of the left elastic member 129 moves leftward. As such, the left elastic member 129 is shortened and elastically restored. When the left tilting frame 125 rotates in the clockwise direction about the tilting shaft 126 when viewed from the rear side, the distal end portion of the second support portion 13b of the left elastic member 129 moves rightward. As such, the left elastic member 129 is lengthened and elastically deformed.

When the right tilting frame 125 rotates in the clockwise direction about the tilting shaft 126 when viewed from the rear side, the distal end portion of the second support portion 13b of the right elastic member 129 moves rightward. As such, the right elastic member 129 is shortened and elastically restored. When the right tilting frame 125 rotates in the counterclockwise direction about the tilting shaft 126 when viewed from the rear side, the distal end portion of the second support portion 13b of the right elastic member 129 moves leftward. As such, the left elastic member 129 is lengthened and elastically deformed.

Referring to FIGS. 11 and 12A to 14, the water supply module 150 supplies water to the spin-mop cleaning module 120. In the drawings, the water W filling the water tank 151 and the water flow direction WF are illustrated. The water supply module 150 supplies water to the water supply space Sw. The water supply module 150 includes the water tank 151, which stores therein water. The water tank 151 is disposed inside the body 110. The water tank 151 is disposed at the upper side of the spin mops 120a and 120b.

In the present embodiment, the water supply module 150 includes a pump 155 for applying pressure to the water W inside the water tank 151 so as to move the water to the spin-mop cleaning module 120.

Although not illustrated, in another embodiment, the water supply module may include a valve, and when the valve is opened, the water inside the water tank may move to the spin-mop cleaning module by the weight thereof without the pump.

Although not illustrated, in a further embodiment, the water supply module may include a water permeable cap. The water permeable cap may be disposed in the supply pipe so that the water moves through the water permeable cap. The water permeable cap may be configured to reduce the flow rate of the water.

Hereinafter, a description will be made based on the present embodiment including the pump 155, but the invention is not necessarily limited thereto.

The water supply module 150 includes the supply pipe 156, which guides the movement of the water W from the water tank 151 to the spin-mop cleaning module 120. The water supply pipe 156 interconnects the water tank 151 and the water feeder 125c to guide the movement of the water. The supply pipe 156 may flexibly bend according to the tilting of the tilting frame 125.

The supply pipe 156 includes a first supply pipe 156-1, which guides movement of the water W from the water tank 151 to the pump 155, and a second supply pipe 156-2, which guides movement of the water W from the pump 155 to the spin-mop cleaning module 120. One end of the first supply pipe 156-1 is connected to the lower portion of the water tank 151, and the other end is connected to the pump 155. One end of the second supply pipe 156-2 is connected to the pump 155, and the other end is connected to the water feeder 125c.

The second supply pipe 156-2 includes a common pipe 156-2m, which guides movement of the water at a relatively upstream side. One end of the common pipe 156-2m is connected to the pump 155, and the other end is connected to a three-way connector 156-2t.

The second supply pipe 156-2 includes a first branch pipe 156-2a for guiding movement of the water W to the left spin-mop module 120-1, and a second branch pipe 156-2b for guiding movement of the water W to the right spin-mop module 120-2. The first branch pipe 156-2a guides some of the water inside the common pipe 156-2m to the left spin-mop module 120-1. The second branch pipe 156-2b guides the remaining water inside the common pipe 156-2m to the right spin-mop module 120-2. One end of the first branch pipe 156-2a is connected to the three-way connector 156-2t, and the other end is connected to the water feeder 125c of the left spin-mop module 120-1. One end of the second branch pipe 156-2b is connected to the three-way connector 156-2t and the other end is connected to the water feeder 125c of the right spin-mop module 120-2.

The second supply pipe 156-2 includes the three-way connector 156-2t, which connects the common pipe 156-2m, the first branch pipe 156-2a, and the second branch pipe 156-2b with each other. The three-way connector 156-2t forms a T-shaped flow path overall. The three-way connector 156-2t includes a flow path portion, which extends in the longitudinal direction and is connected to the common pipe 156-2m. The three-way connector 156-2t includes two branch flow-path portions, which extend respectively in two directions from the flow-path portion connected to the common pipe 156-2m. The two branch flow-path portions are respectively connected to the first branch pipe 156-2a and the second branch pipe 156-2b.

Figure 13:
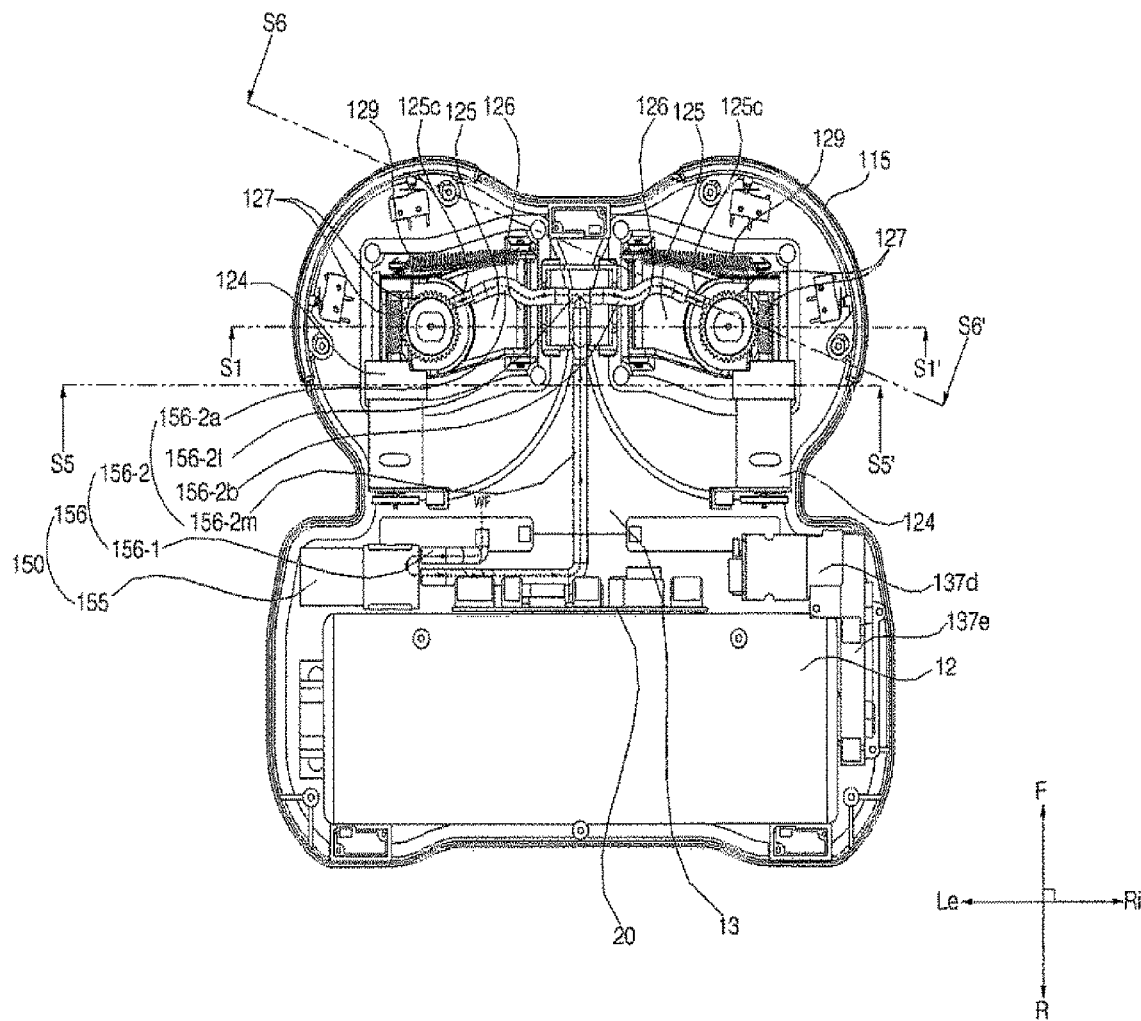
FIG. 13 is a top view of the cleaner 100 of FIGS. 12A and 12B.
Figure 14:
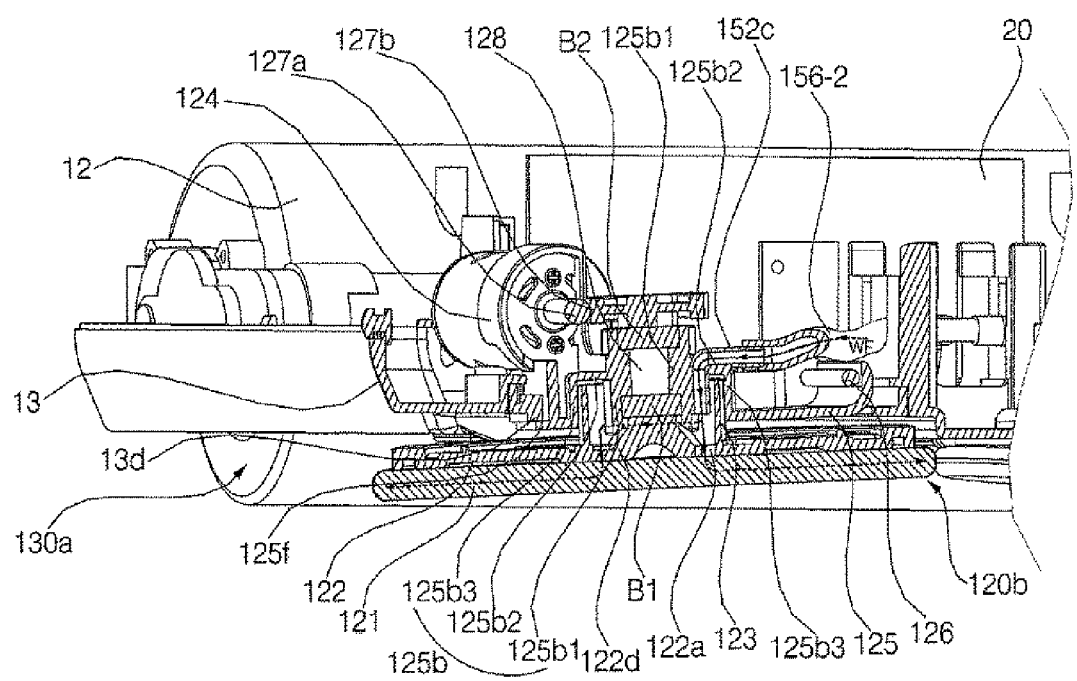
FIG. 14 is a vertical cross-sectional view of the cleaner 100 taken along line S6-S6' of FIG. 13.

A description related to the water flow direction WF will be made below with reference to FIGS. 11, 13 and 14. The pump 155 may be driven to cause movement of the water W. The water W inside the water tank 151 is introduced into the water feeder 125c through the water supply pipe 156. The water W inside the water tank 151 sequentially passes through the first supply pipe 156-1 and the second supply pipe 156-2. The water W inside the water tank 151 sequentially passes through the common pipe 156-2m and the first branch pipe and is introduced into the water feeder 125c of the left spin-mop module 120-1. The water W inside the water tank 151 sequentially passes through the common pipe 156-2m and the second branch pipe and is introduced into the water feeder 125c of the right spin-mop module 120-2.

The water introduced into the water feeder 125c passes through the tilting frame 125 and is introduced into the water supply reservoir 123. The water introduced into the water supply reservoir 123 passes through the water supply hole 122a and is introduced into the center portion of the mop unit 121. The water introduced into the center portion of the mop unit 121 moves to the edge of the mop unit 121 by centrifugal force generated by rotation of the mop unit 121. The water remaining on the floor surface is mopped by the mop unit 131 of the rolling-mop cleaning module 130, which follows the mop unit 121 at the rear side thereof.

What is claimed is:

1. A cleaner comprising:
a body;
a spin-mop cleaning module supporting the body and comprising at least one spin-mop provided to come into contact with a floor while rotating in a clockwise direction or in a counterclockwise direction when viewed from an upper side of the spin-mop cleaning module,
wherein the at least one spin-mop rotates about a tilting rotational axis so that an inclination angle of a lower surface of the spin mop is changeable relative to a horizontal plane, and
wherein the spin-mop cleaning module further comprises at least one elastic member configured to apply an elastic force so that the inclination angle is increased,
a tilting frame configured to rotatably support the spin-mop and configured to be rotatable about the tilting rotational axis relative to the body,
a first support portion fixed to the tilting frame and supporting one end of the elastic member; and
the body comprises a second support portion fixed to the body and supporting the other end of the elastic member,
wherein:
a first point at which the elastic member is fixed on the first support portion is spaced apart from the tilting rotational axis in a first direction crossing a direction in which the tilting rotational axis extends,
a second point at which the elastic member is fixed on the second support portion is spaced apart from the tilting rotational axis in a second direction crossing the direction in which the tilting rotational axis extends and wherein the second direction crosses the first direction,
a first separation distance between the first point at which the elastic member is fixed on the first support portion and the tilting rotational axis is shorter than a second separation distance between the second point at which the elastic member is fixed on the second support portion and the tilting rotational axis, and the elastic member supported between the first and second support portions transmits a restoring force to the tilting frame about the tilting rotational axis relative to the body, and hence to the spin-mop rotatably supported on the tilting frame,
wherein: the body comprises an upper-end limit forming a lower surface; and
the spin-mop cleaning module further comprises an upper-end-limit contact portion, an upper surface of which is configured to contact with the upper-end limit in a state in which the inclination angle reaches a minimum value, and configured to be spaced apart from the upper-end limit in a state in which the inclination angle exceeds the minimum value.

2. The cleaner according to claim 1, wherein the tilting rotational axis extends in a horizontal direction.

3. The cleaner according to claim 1, wherein the at least one spin mop is configured to be rotatable within a predetermined range about the tilting rotational axis.

4. The cleaner according to claim 1, wherein the spin-mop cleaning module further comprises:
a mop unit provided to come into contact with the floor;
a rotating plate to which the mop unit is fixed; and
a spin shaft connected to an upper side of the rotating plate,
wherein the tilting frame is configured to rotatably support the spin shaft.

5. The cleaner according to claim 4, wherein the spin-mop cleaning module further comprises a tilting shaft supported by the body and disposed to penetrate the tilting frame, the tilting shaft having the tilting rotational axis.

6. The cleaner according to claim 5, wherein: the body comprises a placement hole formed in a lower surface thereof;
the body comprises a support member configured to extend along an edge of the placement hole and forming a hole in a center in which the tilting frame is disposed; and
the support member comprises a tilting-shaft support portion configured to support the tilting shaft.

7. The cleaner according to claim 4, wherein: the tilting frame comprises:
a frame base forming a lower surface;
a vertical portion protruding upward from a portion of the frame base, which extends in a direction away from the tilting rotational axis, of an edge of the frame base; and
a distance holder protruding from a portion of the vertical portion in an extending direction of the tilting rotational axis and extending in a vertical direction; and
the body comprises a guide portion disposed slidably with a protruding distal end of the distance holder.

8. The cleaner according to claim 4, wherein: the body comprises a lower-end limit forming an upper surface; and
the spin-mop cleaning module further comprises a lower-end-limit contact portion, a lower surface of which is configured to contact with the lower-end limit in a state in which the inclination angle reaches a maximum value, configured to be spaced apart from the lower-end limit in a state in which the inclination angle is below the maximum value.

9. The cleaner according to claim 4, wherein the spin-mop cleaning module further comprises a spin-drive unit fixed to the tilting frame so as to integrally move with the tilting frame, the spin-drive unit providing a drive force for rotation of the spin mop.

10. The cleaner according to claim 1, wherein: the at least one spin mop comprises a left spin mop and a right spin mop arranged at left and right sides; and
a downward inclination direction of a lower surface of the left spin mop and a downward inclination direction of a lower surface of the right spin mop are bilaterally symmetrical to each other.

11. The cleaner according to claim 10, wherein the at least one elastic member comprises:
a left elastic member configured to apply the elastic force so that the inclination angle of the lower surface of the left spin mop is increased; and
a right elastic member configured to apply the elastic force so that the inclination angle of the lower surface of the right spin mop is increased.

12. The cleaner according to claim 10, wherein the at least one elastic member comprises:

a left elastic member configured to apply the elastic force so that a leftward and downward inclination of the lower surface of the left spin mop is increased; and a right elastic member configured to apply the elastic force so that a rightward and downward inclination of the lower surface of the right spin mop is increased.

13. The cleaner according to claim 1, wherein: the at least one spin mop comprises a left spin mop and a right spin mop arranged at left and right sides; and a tilting rotational axis of the left spin mop and a tilting rotational axis of the right spin mop are bilaterally symmetrical to each other.

* * * * *